US012394896B2

(12) United States Patent
Sleasman et al.

(10) Patent No.: US 12,394,896 B2
(45) Date of Patent: Aug. 19, 2025

(54) TUNABLE METASURFACE DEVICE

(71) Applicant: The Johns Hopkins University, Baltimore, MD (US)

(72) Inventors: Timothy A. Sleasman, Catonsville, MD (US); David B. Shrekenhamer, Bethesda, MD (US); Ra'id S. Awadallah, Baltimore, MD (US); Robert S. Duggan, Bethesda, MD (US)

(73) Assignee: The Johns Hopkins University, Baltimore, MD (US)

( * ) Notice: Subject to any disclaimer, the term of this patent is extended or adjusted under 35 U.S.C. 154(b) by 132 days.

(21) Appl. No.: 18/539,642

(22) Filed: Dec. 14, 2023

(65) Prior Publication Data

US 2024/0204405 A1 Jun. 20, 2024

Related U.S. Application Data

(60) Provisional application No. 63/432,425, filed on Dec. 14, 2022.

(51) Int. Cl.
*H01Q 3/46* (2006.01)

(52) U.S. Cl.
CPC .................................... *H01Q 3/46* (2013.01)

(58) Field of Classification Search
CPC .................................. H01Q 3/44; H01Q 3/46
See application file for complete search history.

(56) References Cited

U.S. PATENT DOCUMENTS

| | | | | |
|---|---|---|---|---|
| 6,917,343 B2 * | 7/2005 | Sanchez | H01Q 9/27 | 343/909 |
| 2010/0301971 A1 * | 12/2010 | Yonak | H01P 7/082 | 333/219.1 |
| 2011/0210903 A1 * | 9/2011 | Sarabandi | H01Q 15/0086 | 343/904 |
| 2022/0399651 A1 * | 12/2022 | Sleasman | H01Q 3/2658 | |

OTHER PUBLICATIONS

Davide Ramaccia et al., "Phase-Induced Frequency Conversion and Doppler Effect With Time-Modulated Metasurfaces," IEEE Transactions on Antennas and Propagation, vol. 68, No. 3, Mar. 2020, pp. 1607-1617.
Zhanni Wu et al., "Space-Time-Modulated Metasurfaces with Spatial Discretization: Free-Space N-Path Systems," American Physical Society, Physical Review Applied, 4, 064060, 2020, pp. 1-19.

* cited by examiner

*Primary Examiner* — Daniel Munoz
(74) *Attorney, Agent, or Firm* — Noah J. Hayward

(57) ABSTRACT

A metasurface device in the form of a unit cell may include a first metasurface sub-cell configured to exhibit a first resonant electromagnetic field (EMF) response and a second metasurface sub-cell configured to exhibit a second resonant EMF response. Each the two metasurface sub-cells may include a patterned layer and a variable impedance element operably coupled to the patterned layer. The variable impedance element may be configured to, in response to receipt of a control signal, change an impedance of the respective metasurface sub-cell based on the control signal to change the EMF response of the sub-cell. The first metasurface sub-cell and the second metasurface sub-cell may be disposed in a cascaded configuration such that first EMF response and the second EMF response couple to exhibit an integrated EMF response for the metasurface unit cell.

20 Claims, 20 Drawing Sheets

TUNABLE METASURFACE DEVICE

CROSS REFERENCE TO RELATED APPLICATION

This application claims priority to and the benefit of prior-filed, U.S. Provisional Application No. 63/432,425 filed on Dec. 14, 2022, the entire contents of which are incorporated herein by reference.

TECHNICAL FIELD

Example embodiments generally relate to metasurface technology and, in particular, relate to dynamically controllable metasurfaces.

BACKGROUND

Innovation in the area of metamaterials continues to accelerate with new properties and associated applications being regularly developed. Metamaterials, which are engineered materials that exhibit properties not found in naturally occurring materials, are typically constructed of constituent components that can be repeated to form a sheet, which may be referred to as a metasurface. Such metamaterials are often developed to have properties that generate or affect electromagnetic fields, and thereby exhibit an electromagnetic field response to a reflected, transmitted, or absorbed electromagnetic field. In this regard, some metamaterials have been designed to exhibit a response that blocks, absorbs, enhances, or even bends electromagnetic waves. As such, metamaterials can offer solutions and achieve benefits that were simply unavailable through the use of conventional materials. While numerous metamaterials and associated metasurfaces have been developed or used in a variety of applications, there continues to be a desire and need to expand dynamic control of the behavior of metasurfaces.

Although some early implementations of metamaterials and metasurfaces have matured, new concepts in the field has continued to fuel innovation. As more technologies emerge from the ever-branching development process, dynamic metasurfaces have excelled as a promising means to dexterously manipulate electromagnetic waves. While passive metasurfaces have found homes in several applications, e.g., microwave imaging and infrared lenses, their dynamic counterparts have been shown to provide added flexibility, enabling them to adapt for situation specific demands.

BRIEF SUMMARY

According to some example embodiments, a metasurface system is provided that may include a metasurface device including at least one metasurface unit cell, a control interface operably coupled to the metasurface device, and control circuitry configured to output a control signal for delivery to the metasurface unit cell to control operation of the metasurface unit cell. The metasurface unit cell may include a first metasurface sub-cell configured to exhibit a first resonant electromagnetic field (EMF) response and a second metasurface sub-cell configured to exhibit a second resonant EMF response. The first metasurface sub-cell may include a first patterned layer and a first variable impedance element operably coupled to the first patterned layer. The first variable impedance element may be configured to, in response to receipt of a first control signal based on a control signal from the control circuitry, change a first impedance of the first metasurface sub-cell based on the first control signal to change the first EMF response. The second metasurface sub-cell may include a second patterned layer and a second variable impedance element. The second variable impedance element may be configured to, in response to receipt of a second control signal based on a control signal from the control circuitry, change a second impedance of the second metasurface sub-cell based on the second control signal to change the second EMF response. The first metasurface sub-cell and the second metasurface sub-cell may be disposed in a cascaded configuration such that first EMF response and the second EMF response couple to exhibit an integrated EMF response for the metasurface unit cell.

According to some example embodiments, a metasurface unit cell for a metasurface device is provided. The metasurface unit cell may include a first metasurface sub-cell configured to exhibit a first resonant electromagnetic field (EMF) response and a second metasurface sub-cell configured to exhibit a second resonant EMF response. The first metasurface sub-cell may include a first patterned layer and a first variable impedance element operably coupled to the first patterned layer. The first variable impedance element may be configured to, in response to receipt of a first control signal, change a first impedance of the first metasurface sub-cell based on the first control signal to change the first EMF response. The second metasurface sub-cell may include a second patterned layer and a second variable impedance element, the second variable impedance element being configured to, in response to receipt of a second control signal, change a second impedance of the second metasurface sub-cell based on the second control signal to change the second EMF response. The first metasurface sub-cell and the second metasurface sub-cell may be disposed in a cascaded configuration such that first EMF response and the second EMF response couple to exhibit an integrated EMF response for the metasurface unit cell.

According to some example embodiments, a method for exhibiting an electromagnetic field (EMF) response from a metasurface unit cell is provided. The method may include receiving a first control signal at a first variable impedance element of a first metasurface sub-cell of the metasurface unit cell and receiving a second control signal at a second variable impedance element of a second metasurface sub-cell of the metasurface unit cell. The method may further include independently modifying a first EMF response exhibited by the first metasurface sub-cell based on the first control signal, and independently modifying a second EMF response exhibited by the second metasurface sub-cell based on the second control signal. The method may also include exhibiting an integrated EMF response by the metasurface unit cell based on coupling of the first EMF response with the second EMF response due to the first metasurface sub-cell and the second metasurface sub-cell being disposed in a cascaded configuration. The integrated EMF response may be controllably tuned by the first control signal and the second control signal to a desired magnitude and phase.

BRIEF DESCRIPTION OF THE SEVERAL VIEWS OF THE DRAWINGS

Figure 1:
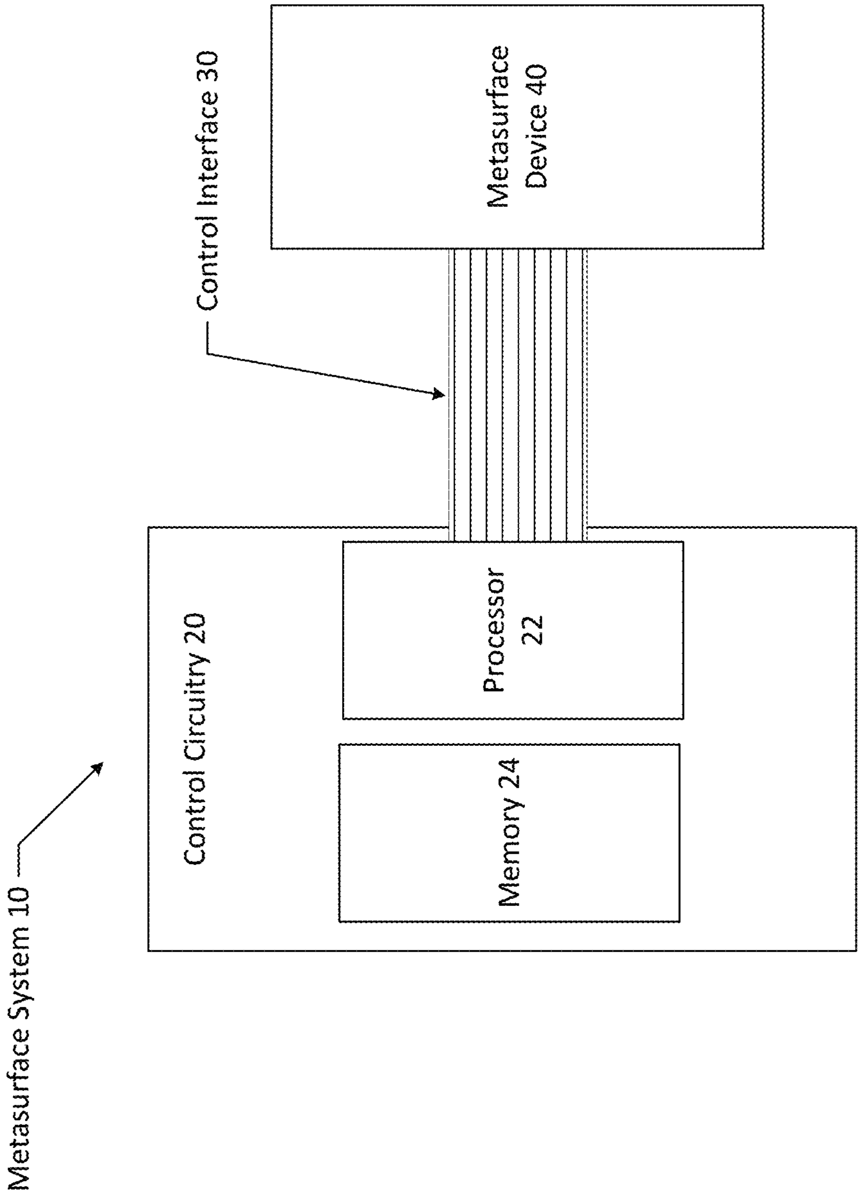
Figure 2:
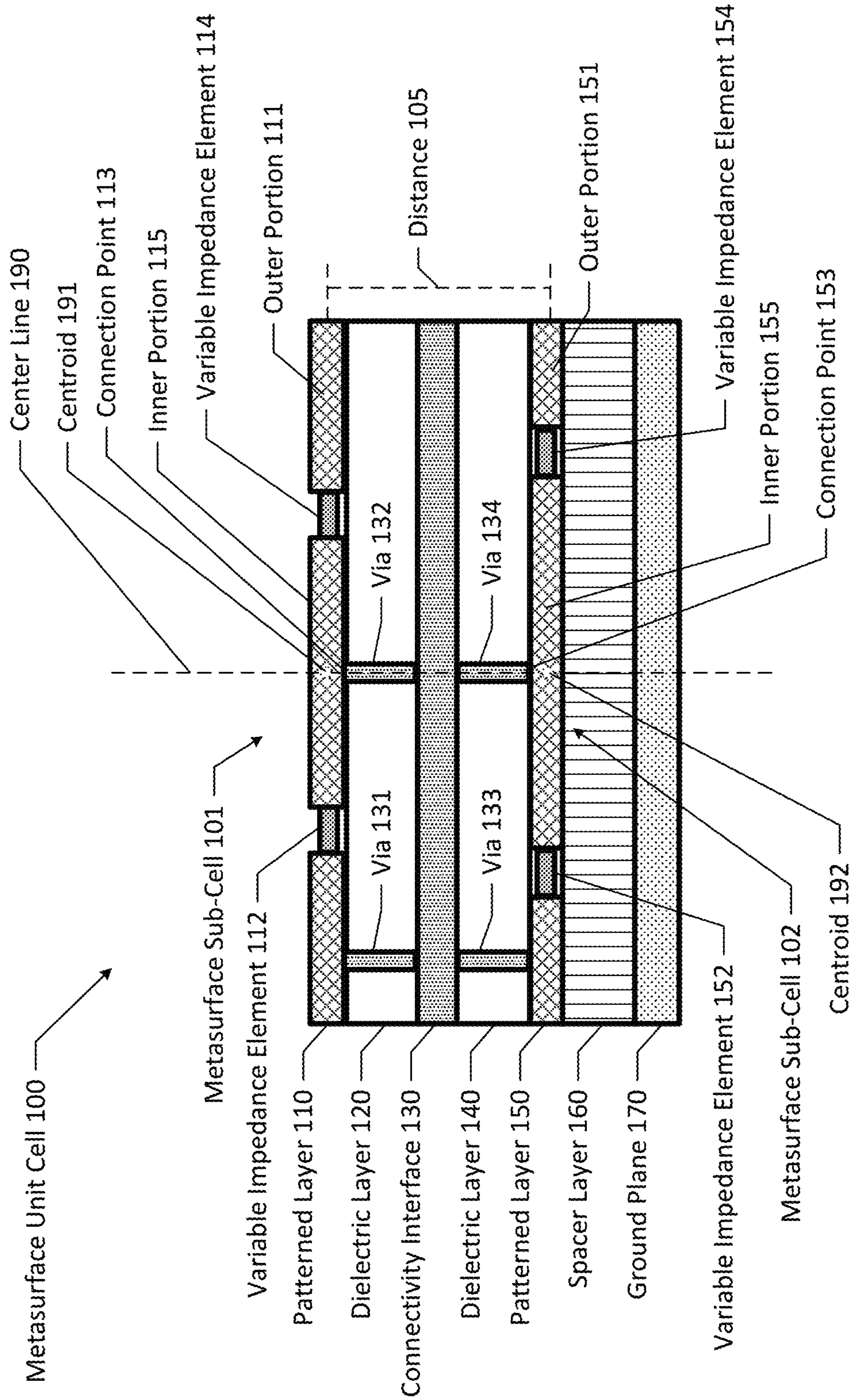
Figure 3:
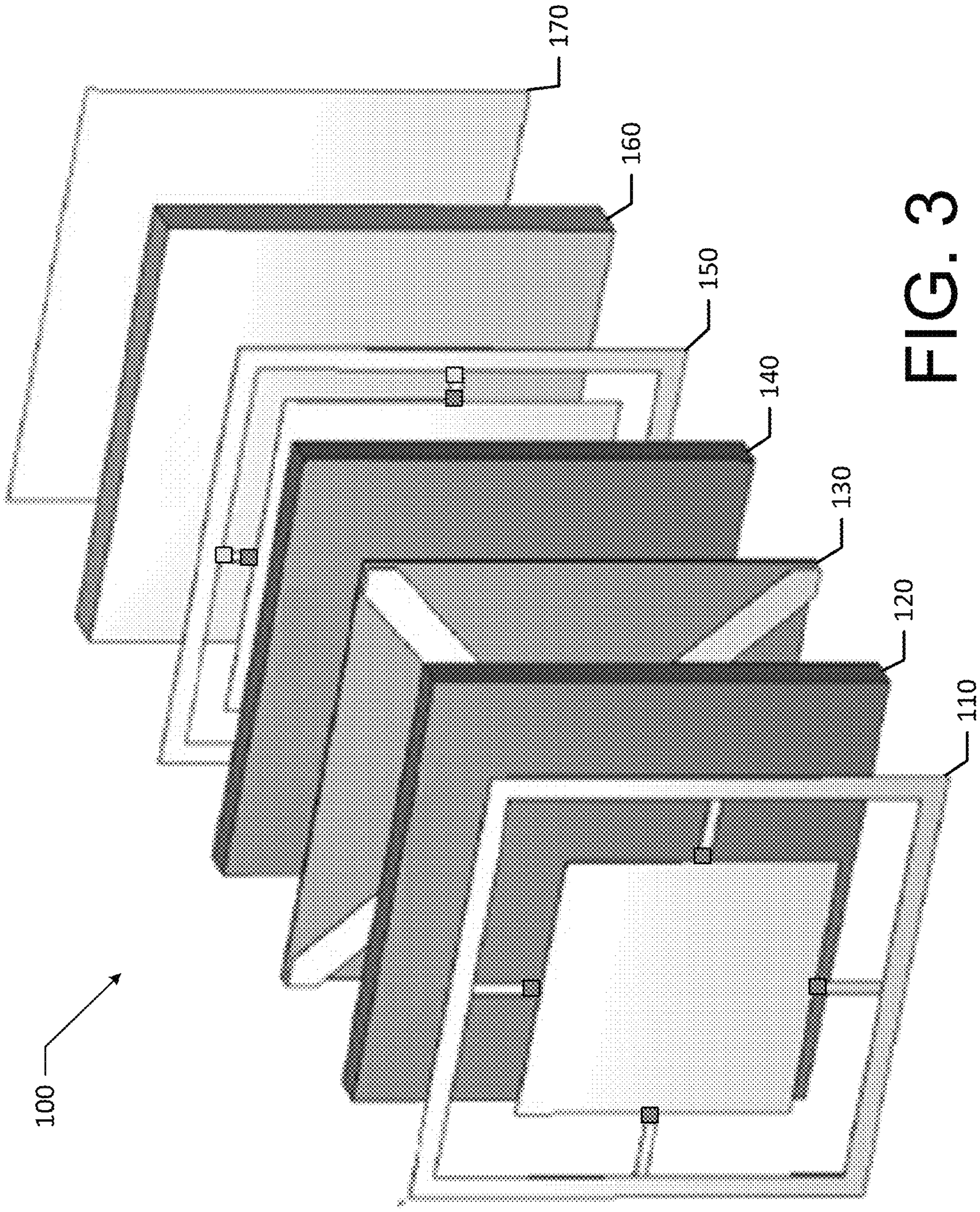
Figure 4:
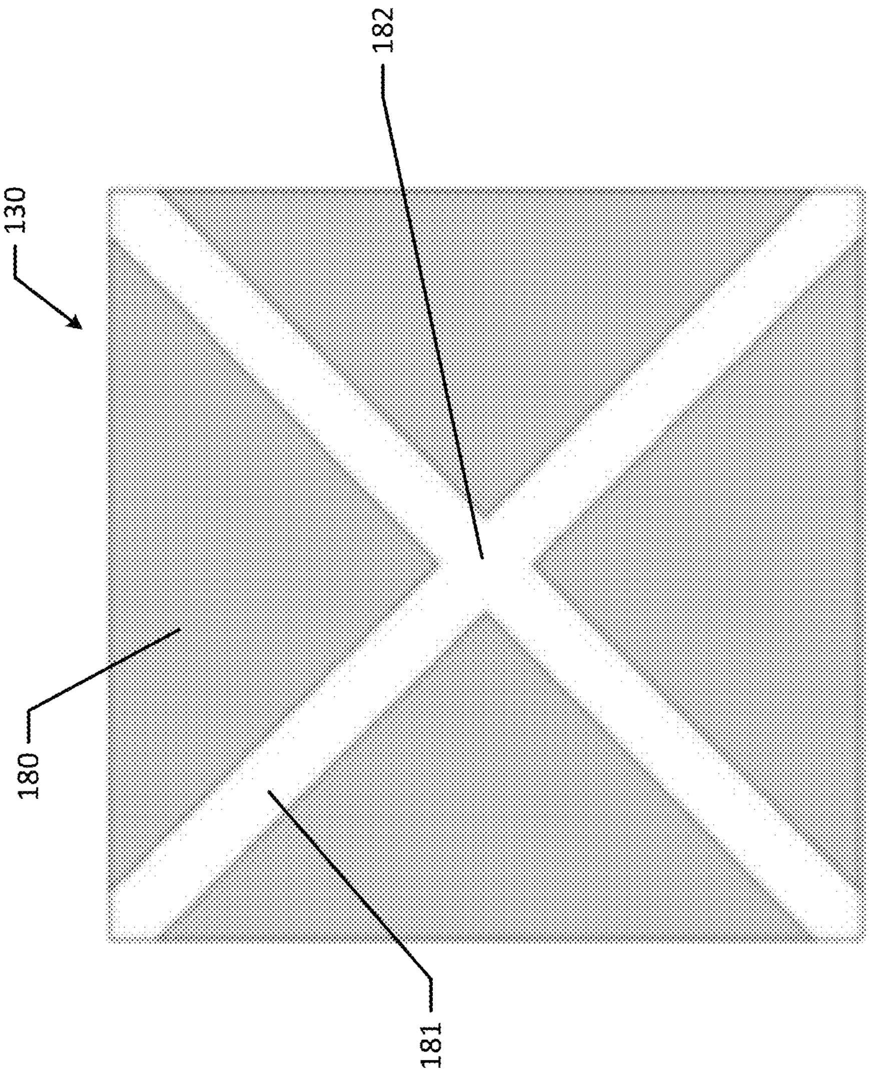
Figure 5:
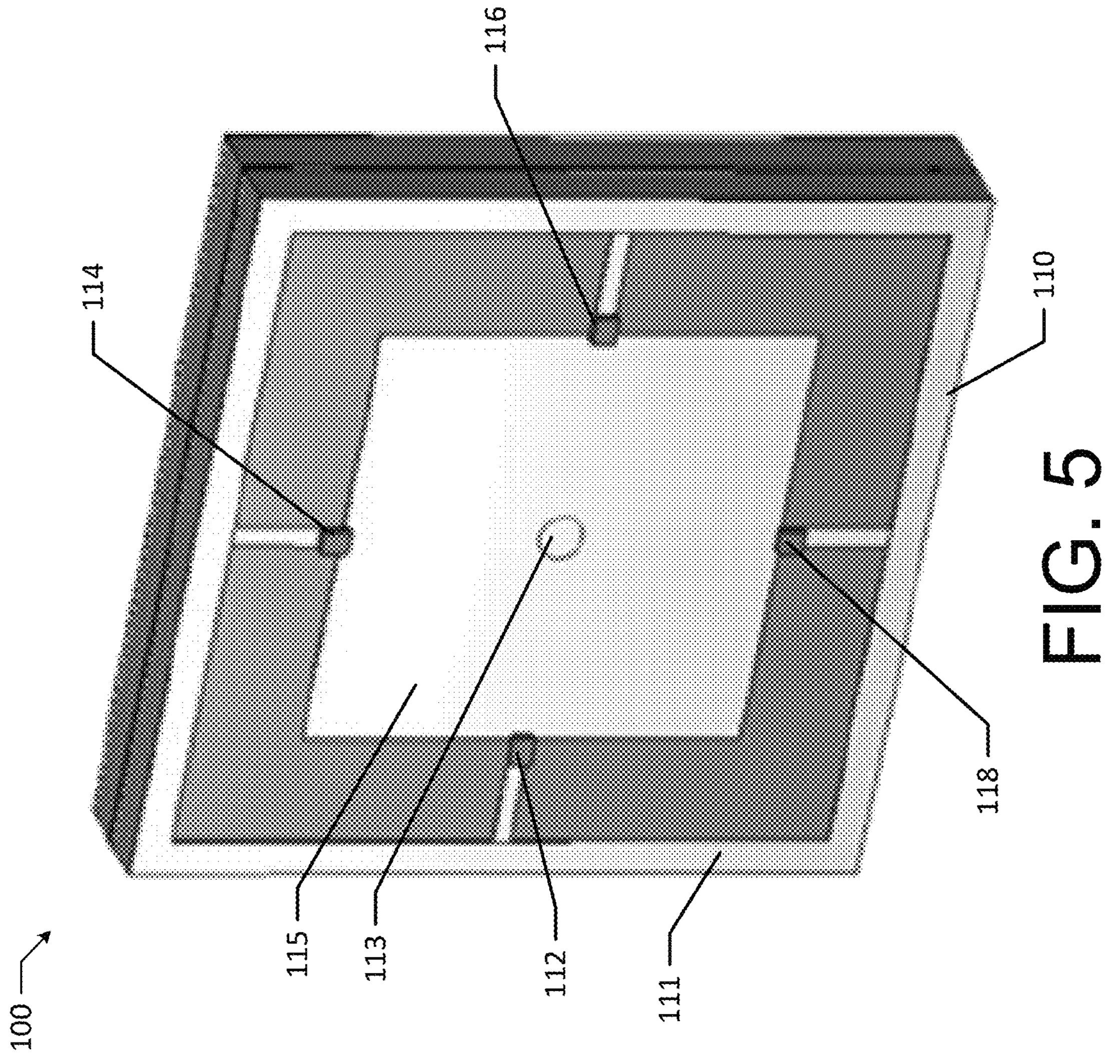
Figure 6:
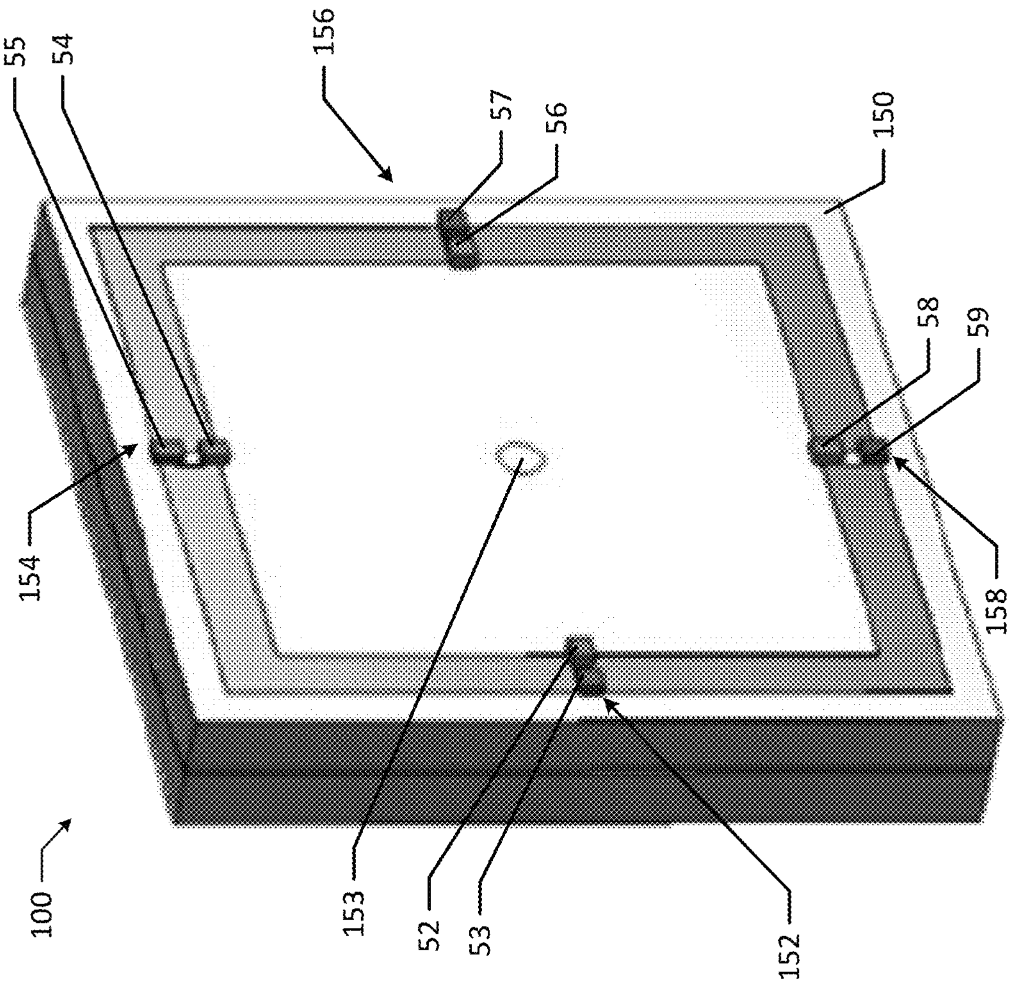
Figure 7:
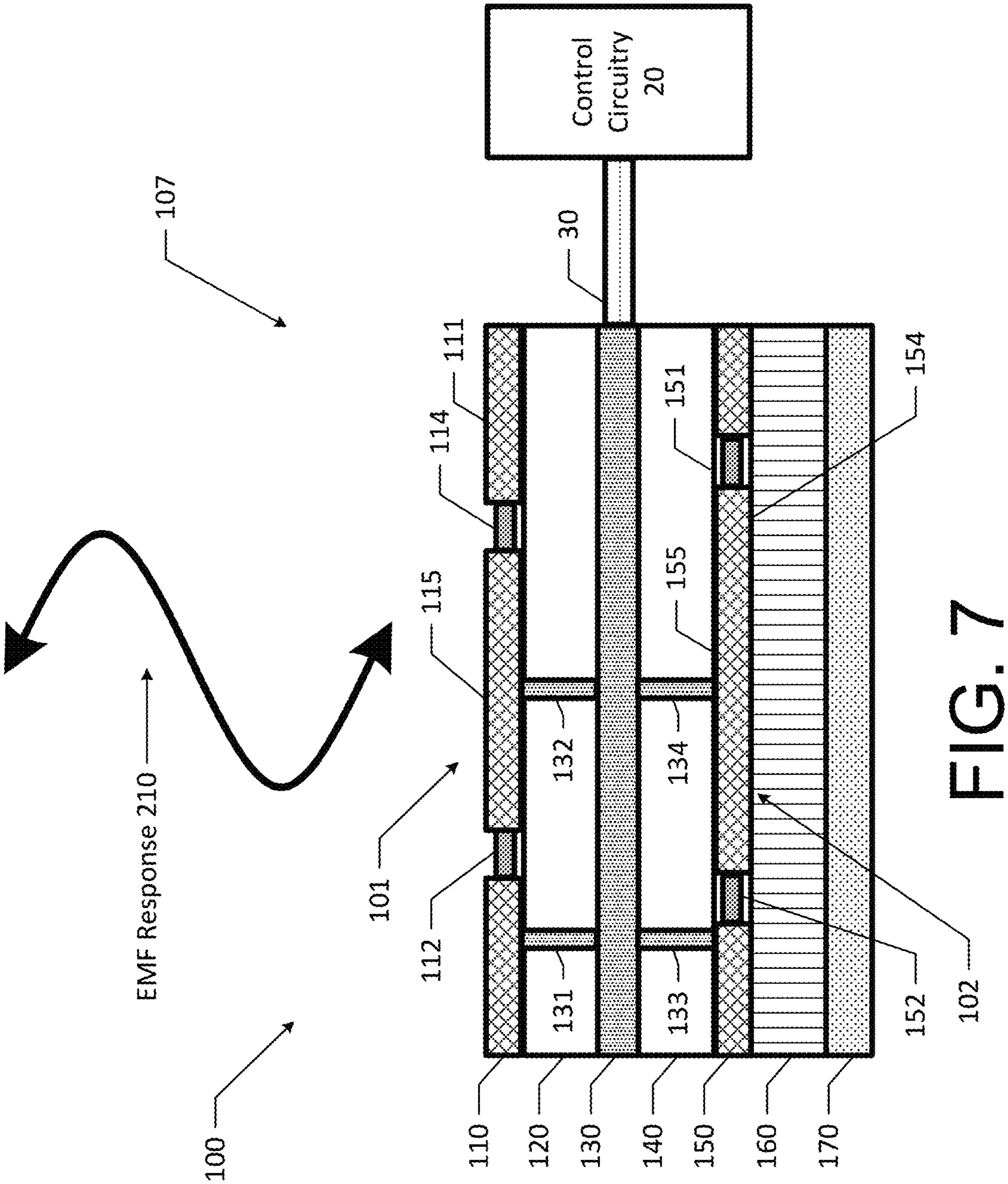
Figure 8:
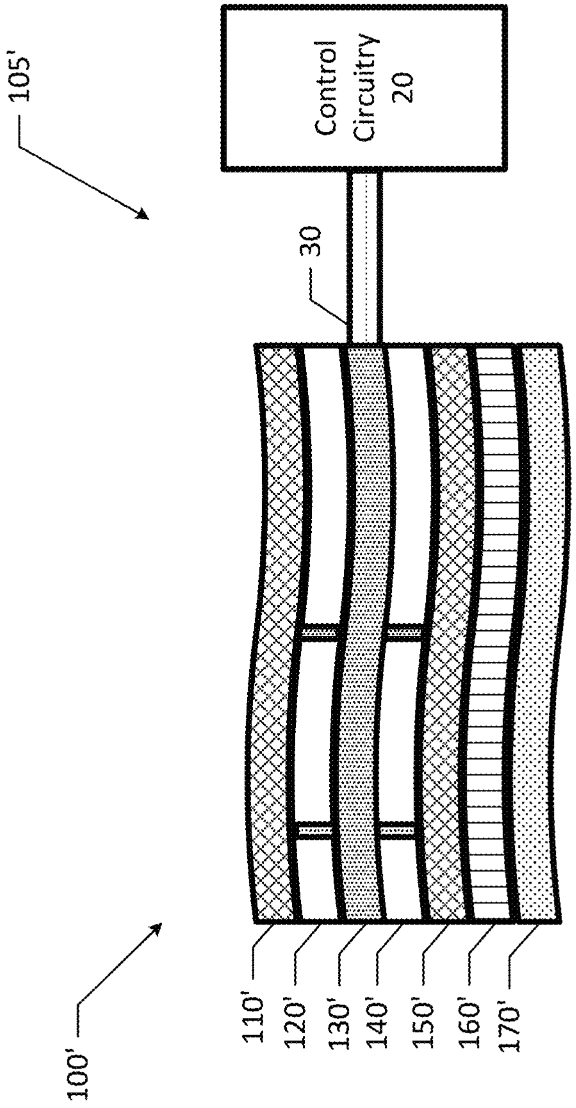
Figure 9:
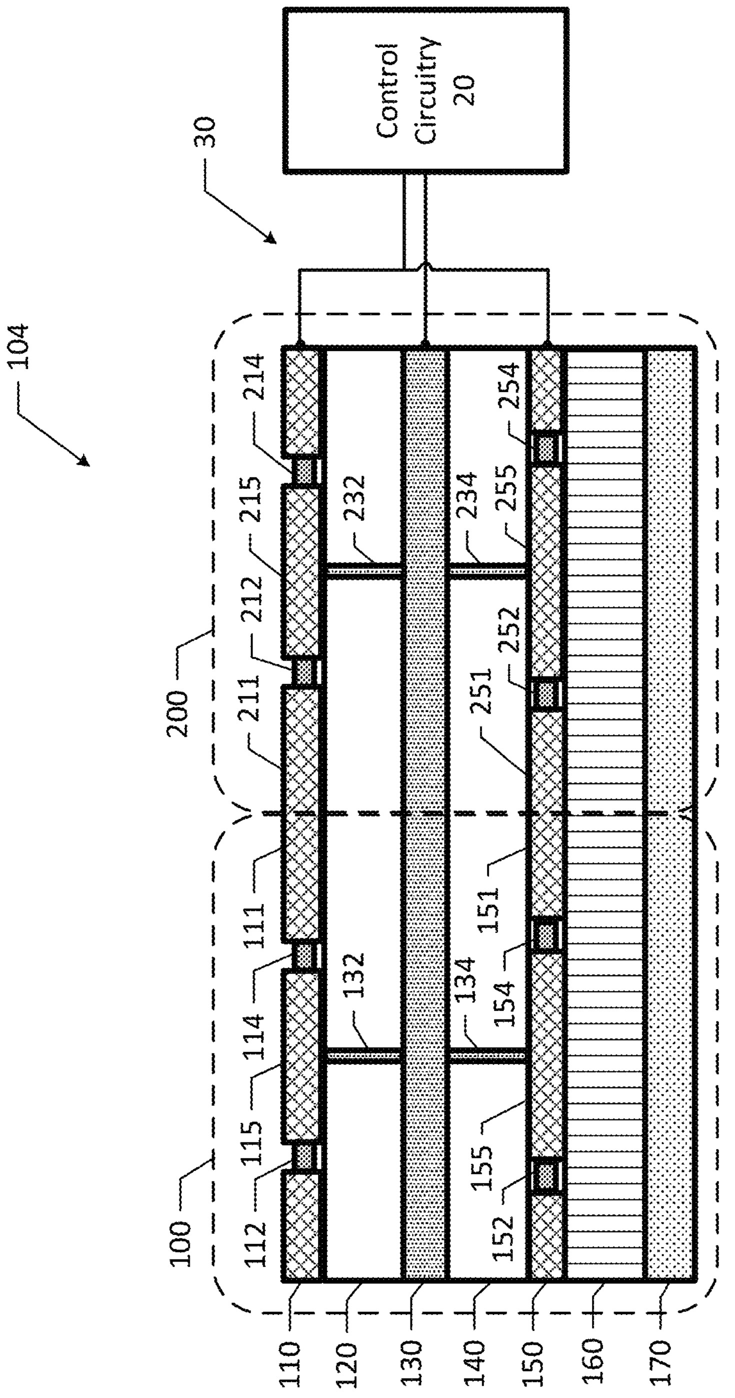
Figure 10:
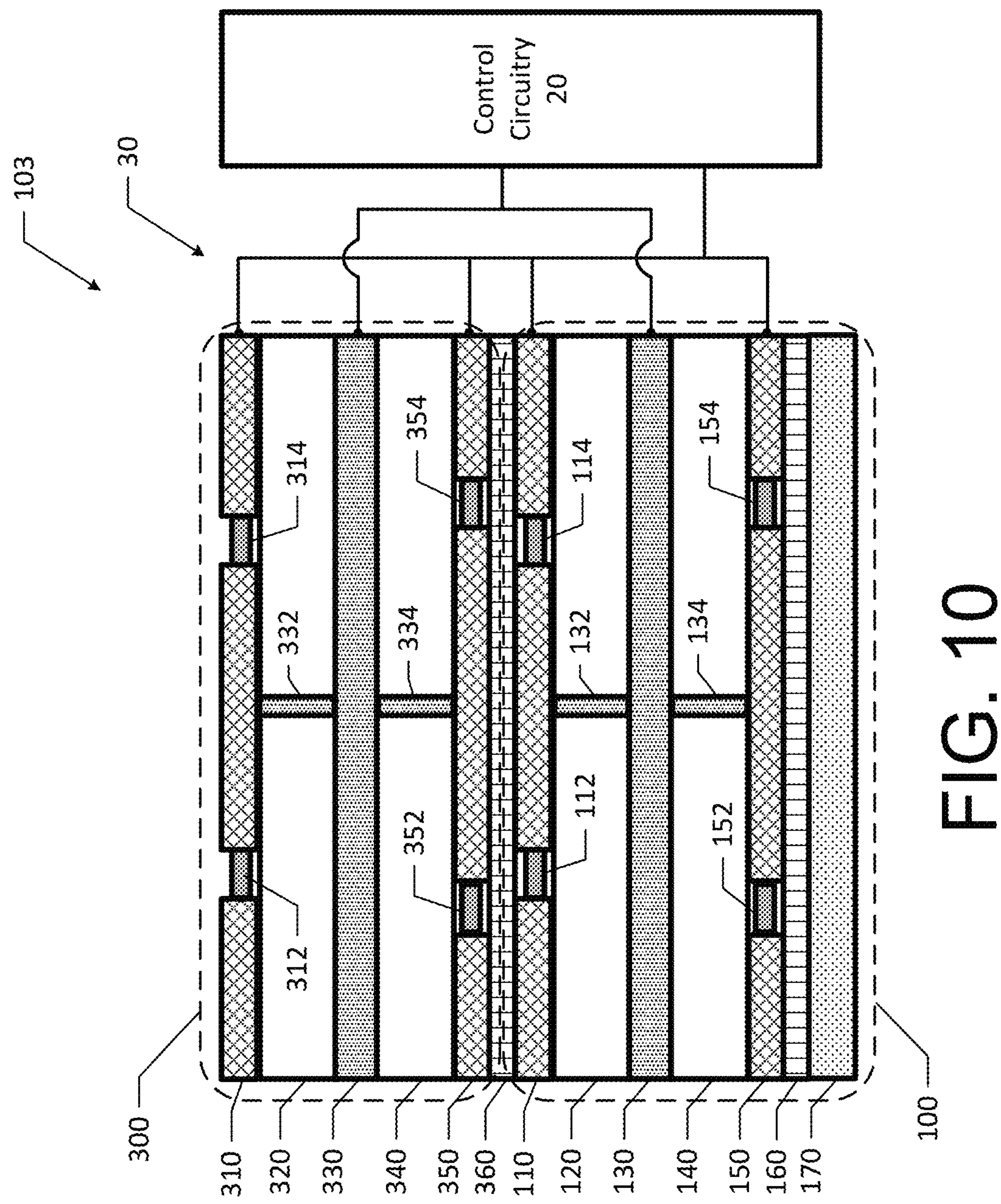
Figure 11:
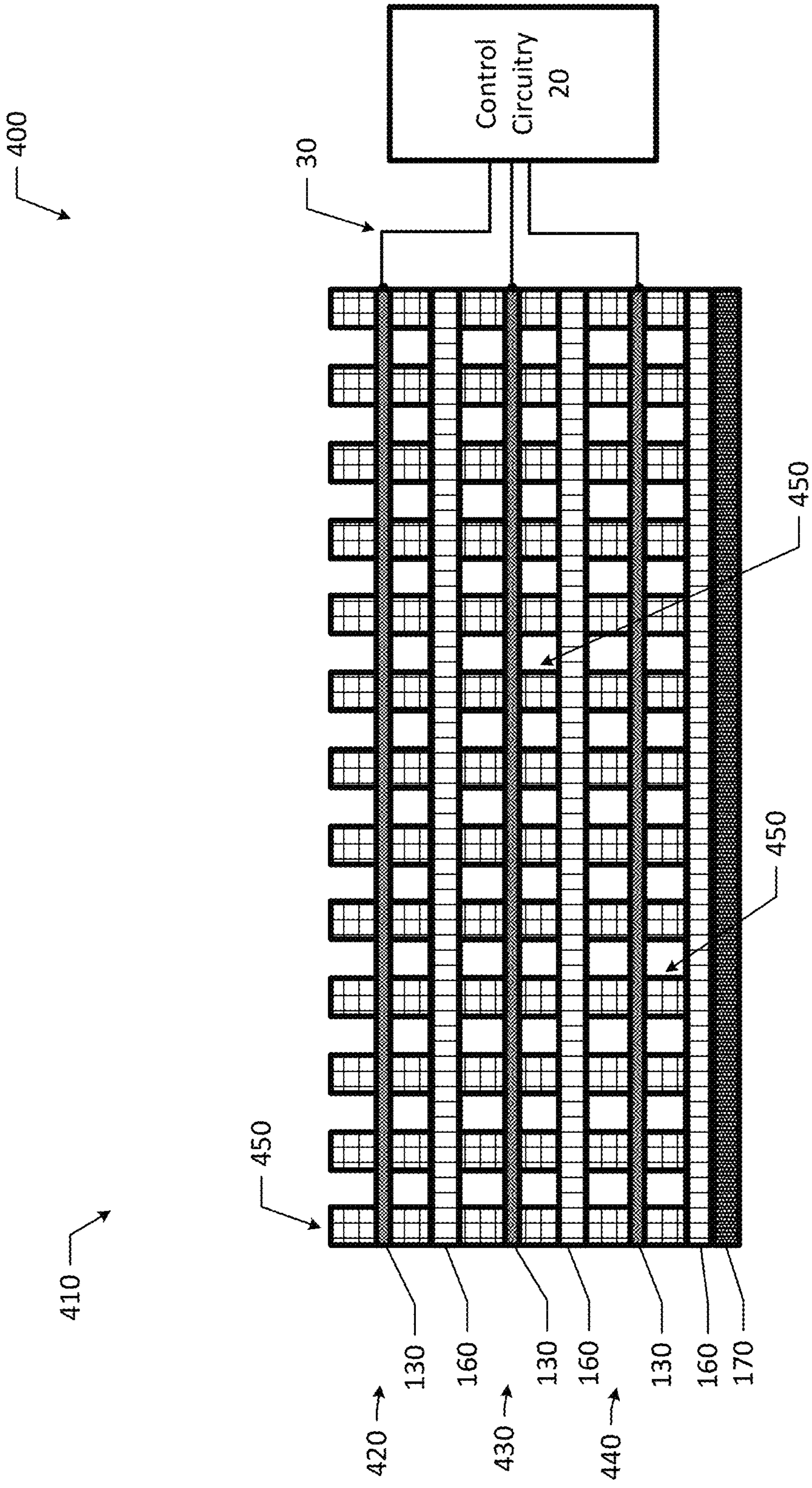
Figure 12:
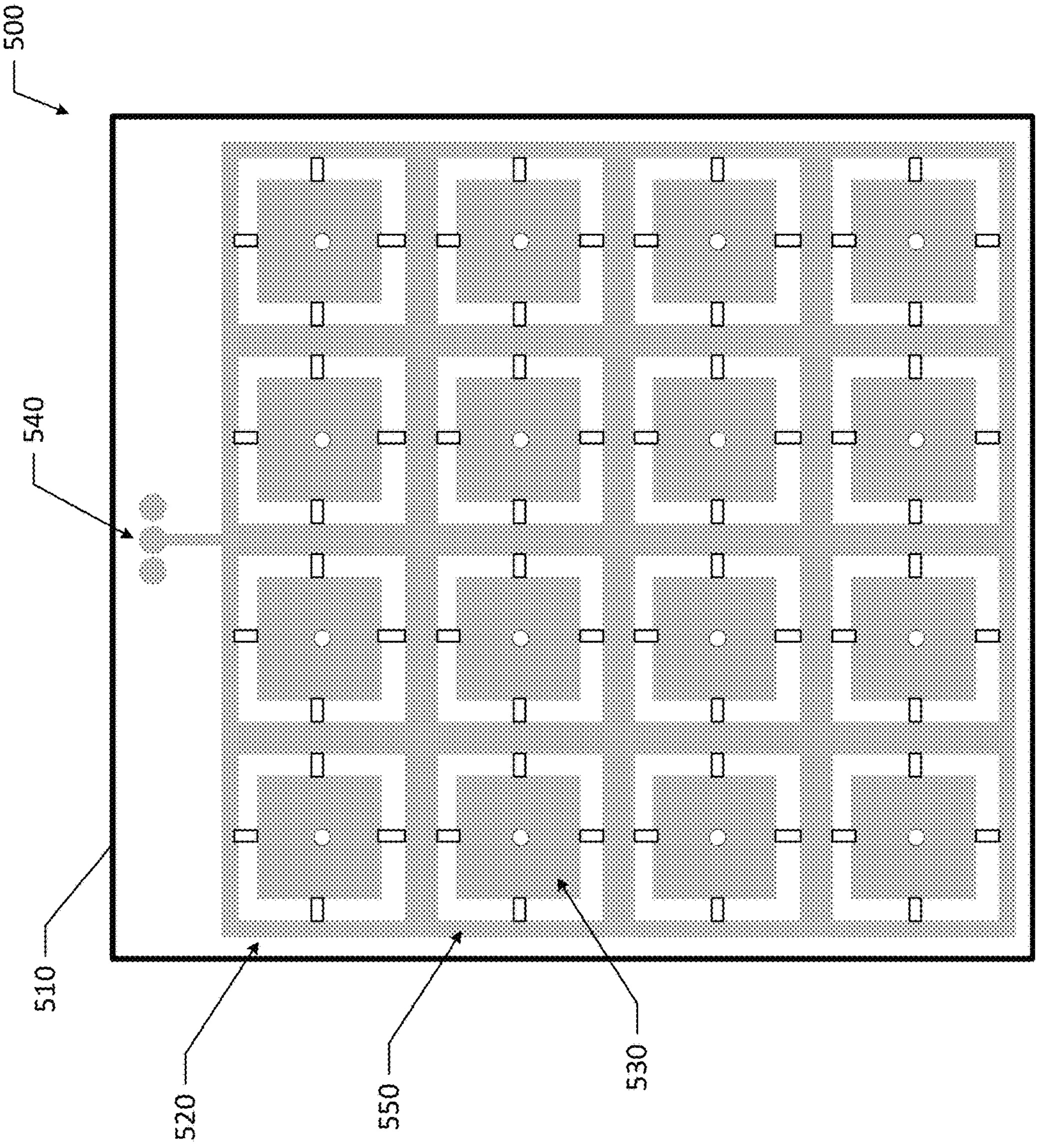
Figure 13A:
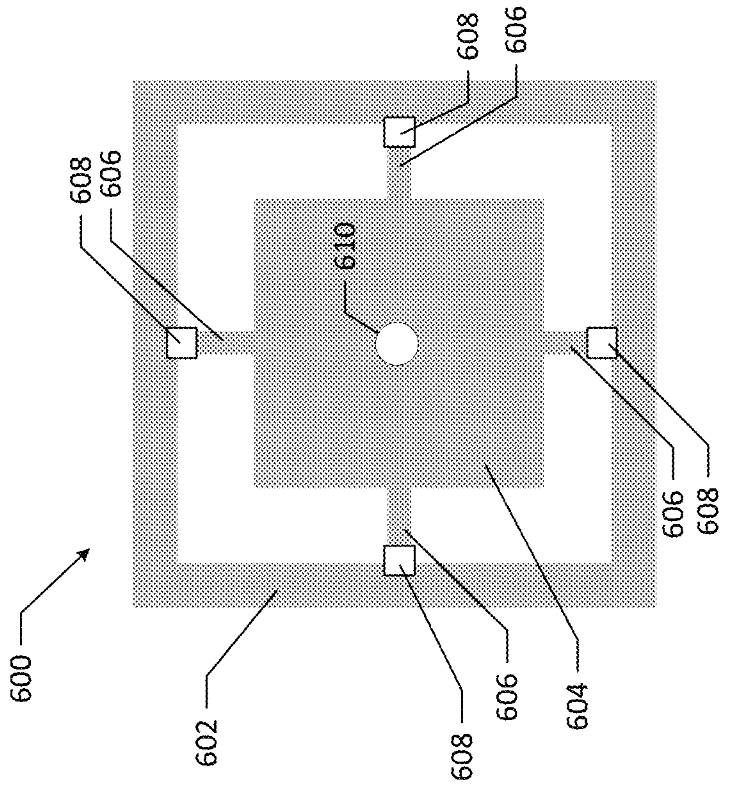
Figure 13B:
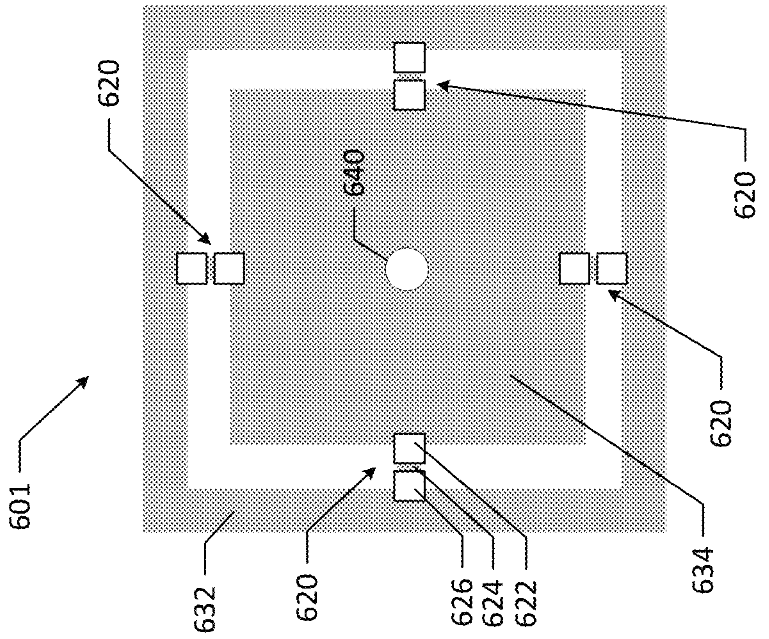
Figure 14:
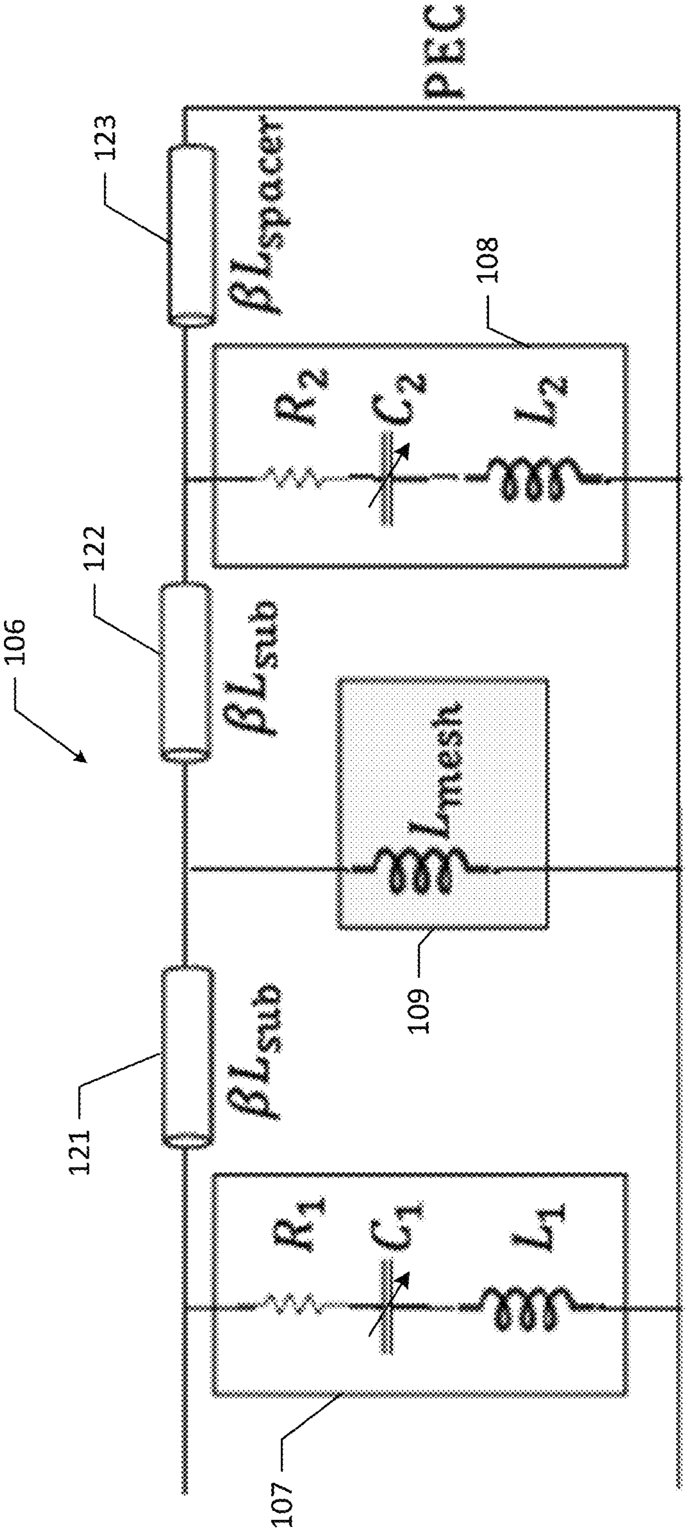
Figure 15:
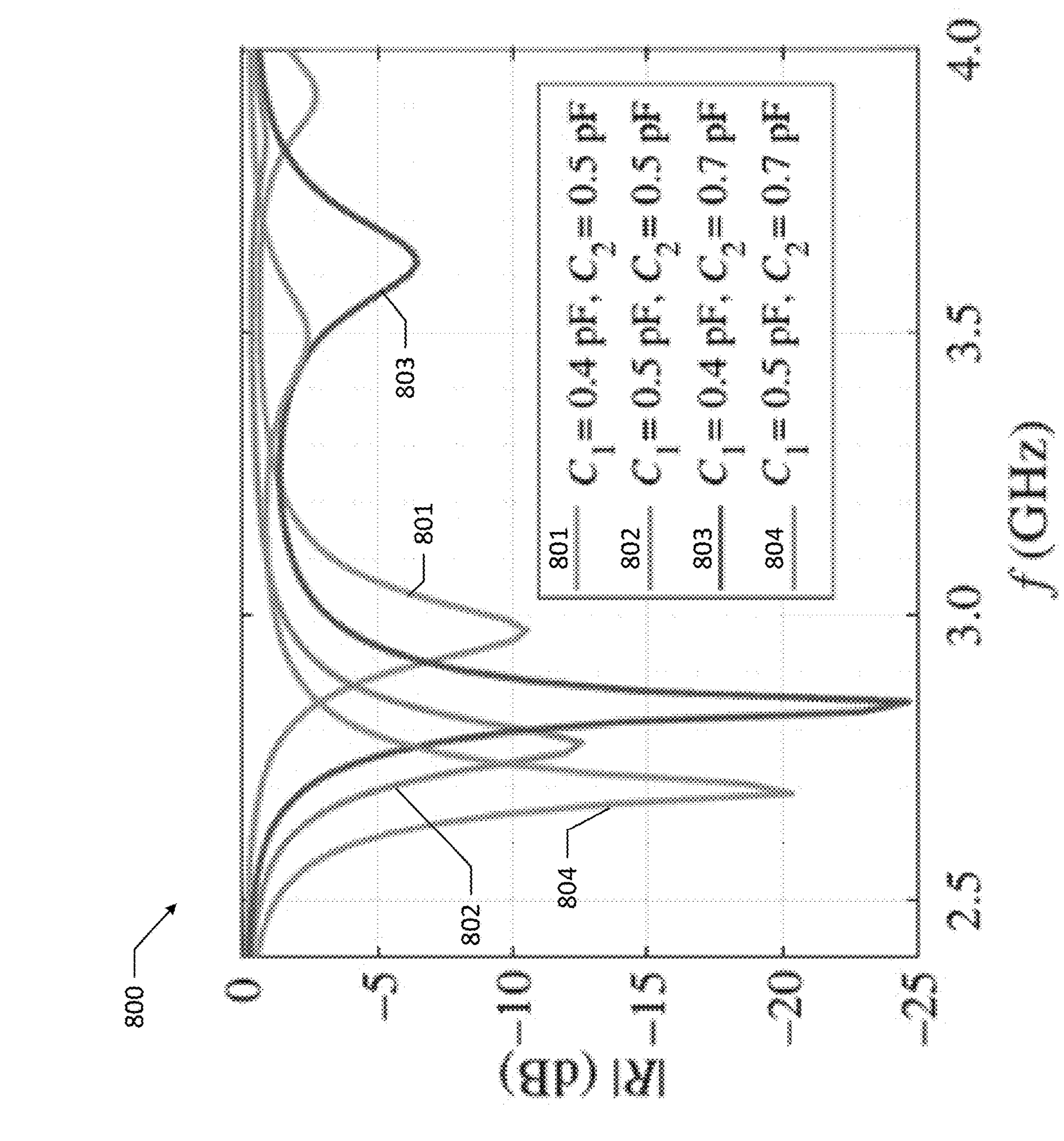
Figure 16:
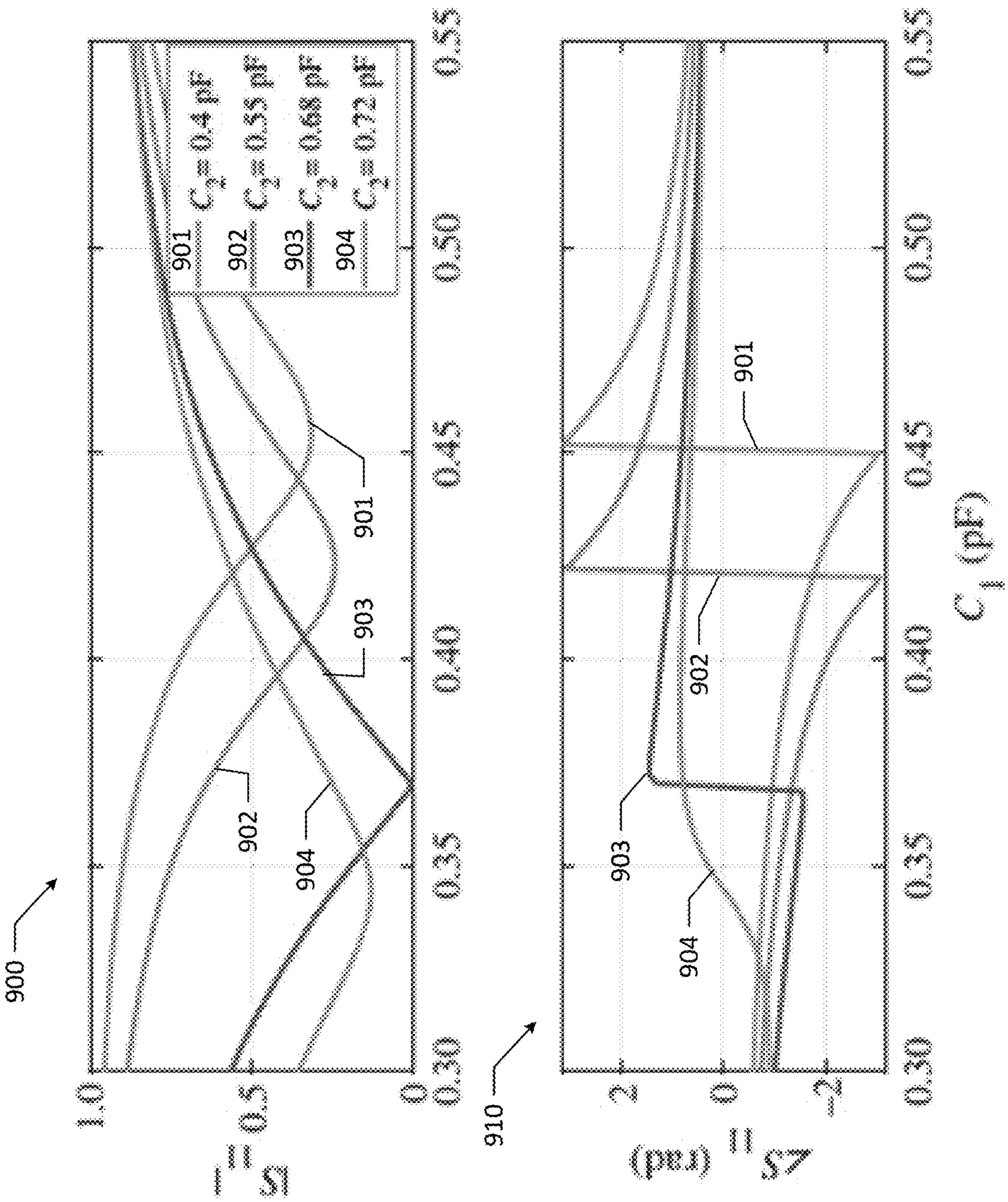
Figure 17:
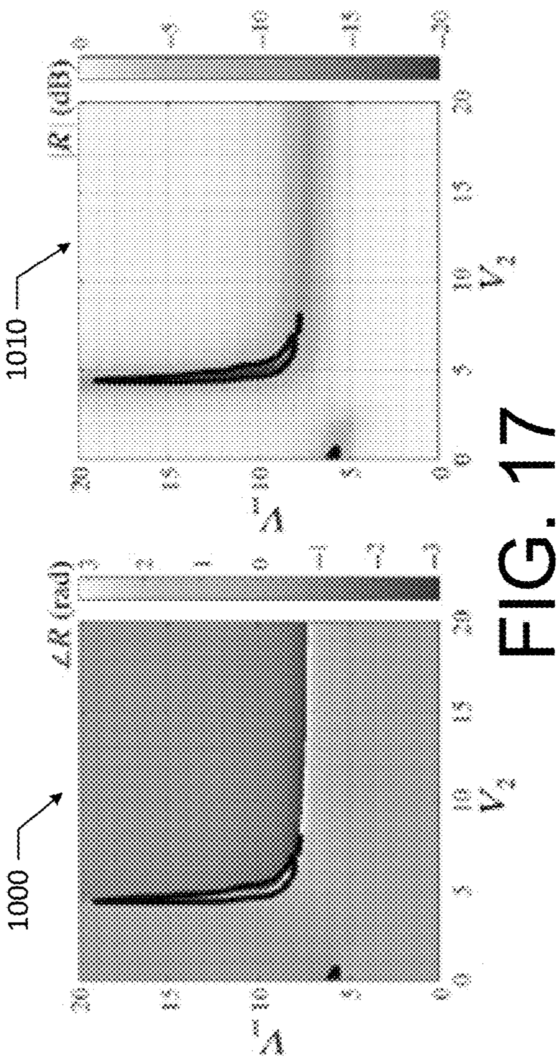
Figure 18:
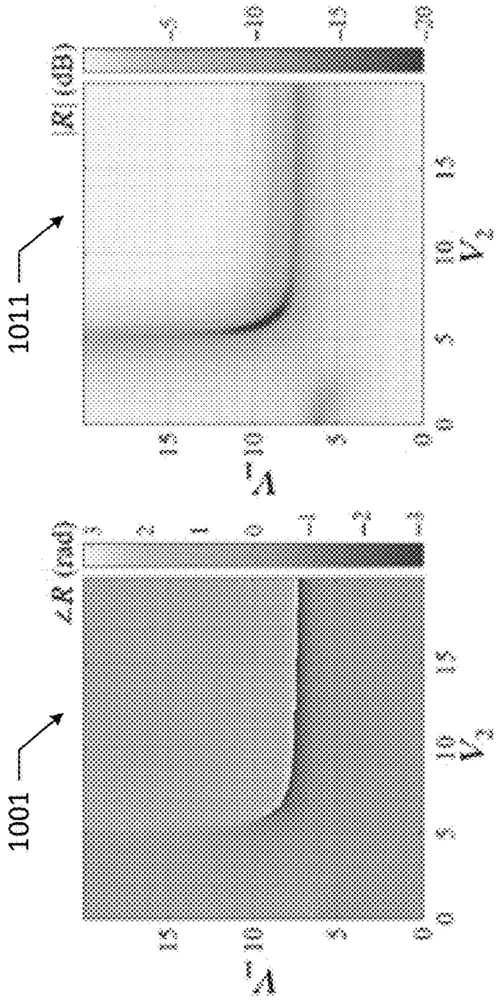
Figure 19:
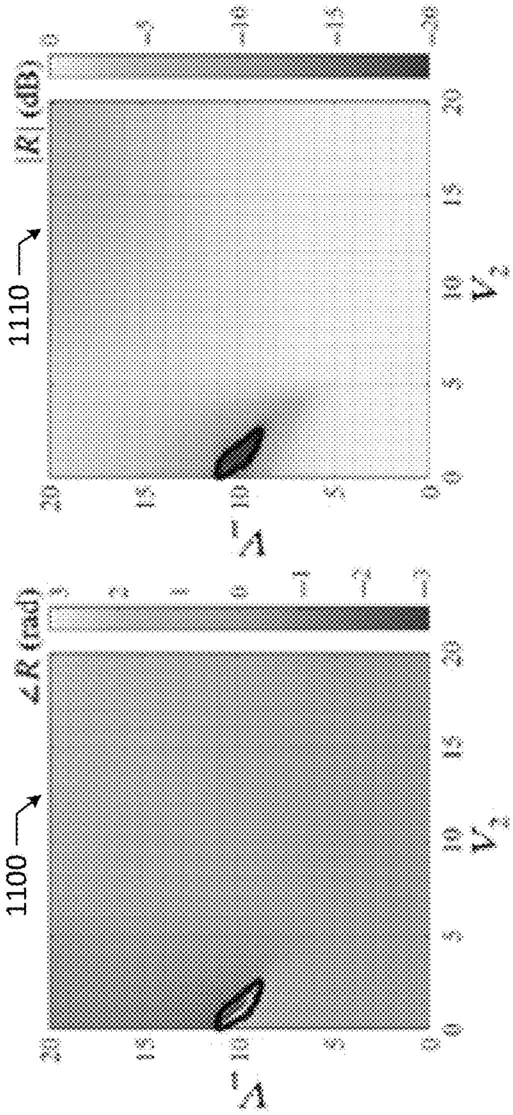
Figure 20:
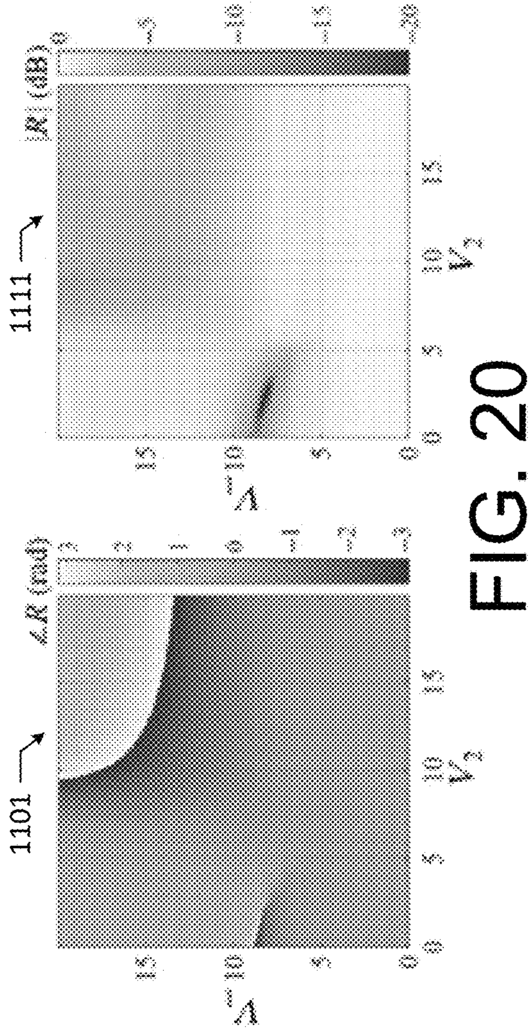
Figure 21:
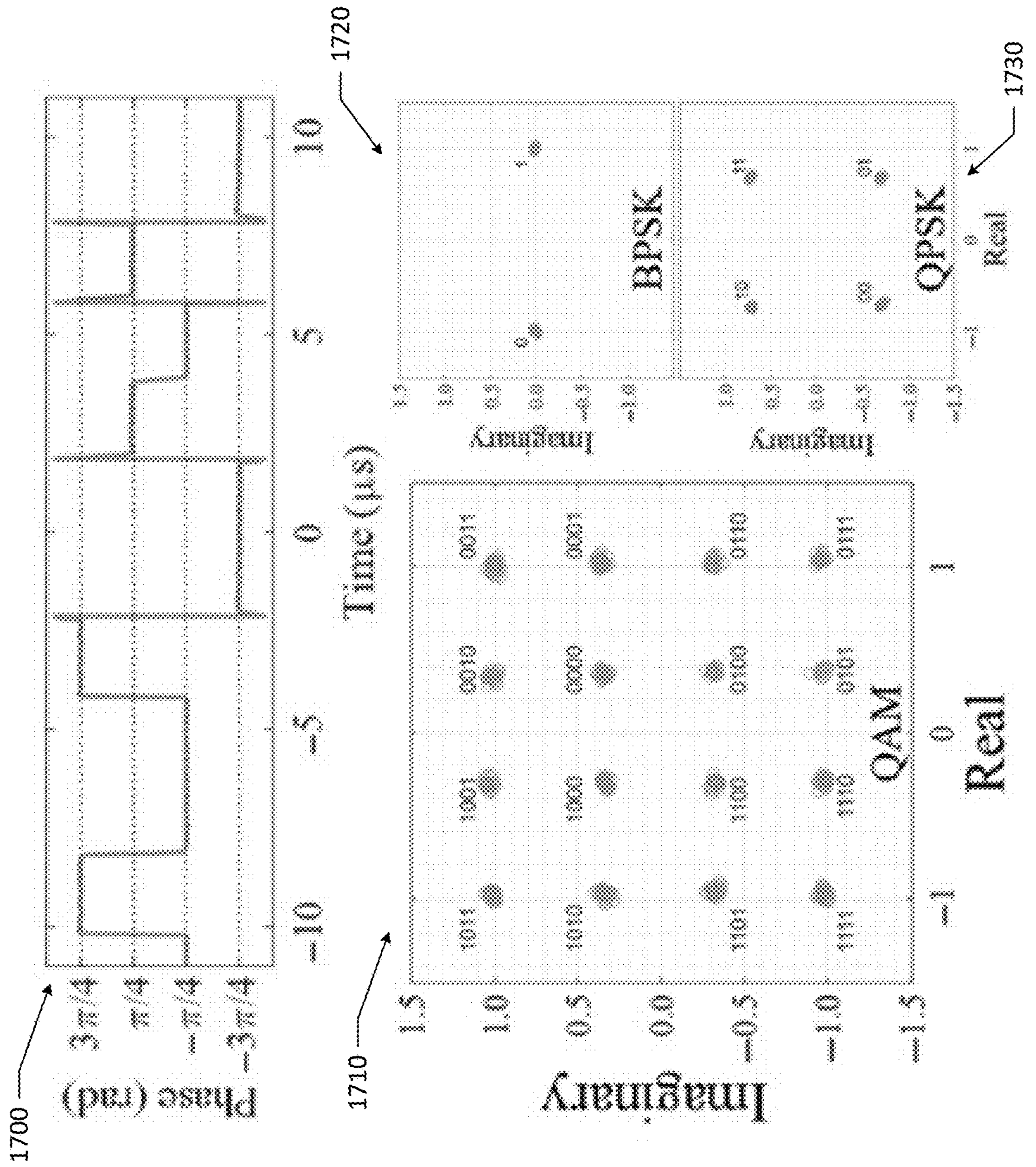
Figure 22:
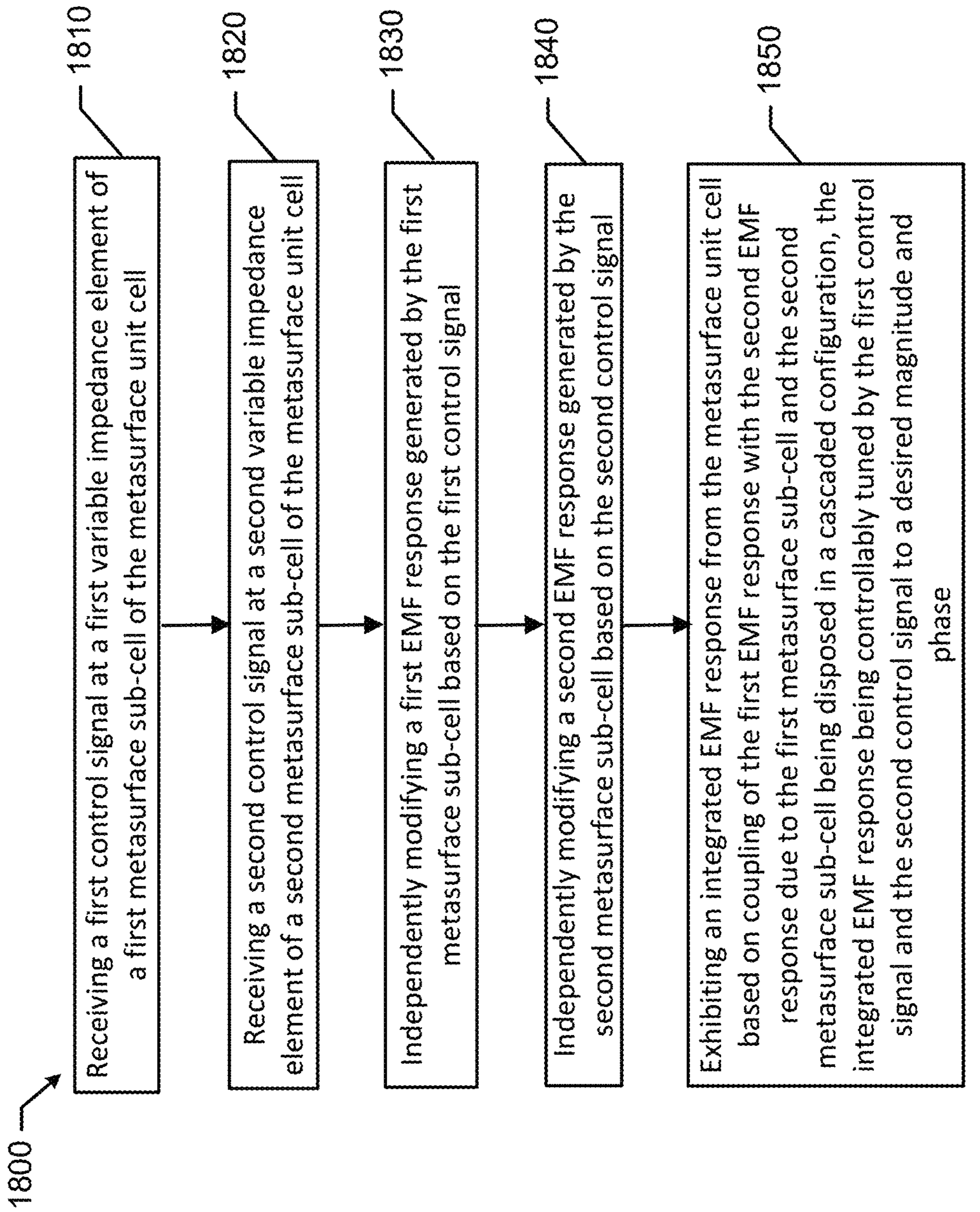

Having thus described some example embodiments in general terms, reference will now be made to the accompanying drawings, which are not necessarily drawn to scale, and wherein:

FIG. 1 illustrates block diagram of a metasurface system according to some example embodiments;

FIG. 2 illustrates a cross-sectional view a metasurface unit cell implemented as a metasurface device according to some example embodiments;

FIG. 3 illustrates an exploded perspective view of the metasurface unit cell according to some example embodiments;

FIG. 4 illustrates an example connectivity interface of the metasurface unit cell according to some example embodiments;

FIG. 5 illustrates a front view of the metasurface unit cell showing a patterned layer according to some example embodiments;

FIG. 6 illustrates a back view of the metasurface unit cell showing another patterned layer according to some example embodiments;

FIG. 7 illustrates a metasurface system for exhibiting an electromagnetic field (EMF) response according to some example embodiments;

FIG. 8 illustrates a metasurface system with a flexible metasurface device according to some example embodiments;

FIG. 9 illustrates an example metasurface system 10 with a metasurface device having side-by-side cells according to some example embodiments;

FIG. 10 illustrates an example metasurface device having stacked or cascaded cells according to some example embodiments;

FIG. 11 illustrates an example metasurface system including a metasurface device having multiple cell layers and stacks according to some example embodiments;

FIG. 12 illustrates an example printed circuit board with a plurality of metasurface cells according to some example embodiments;

FIG. 13A illustrates an example patterned layer of a metasurface sub-cell according to some example embodiments;

FIG. 13B illustrates a different example patterned layer of a different metasurface sub-cell according to some example embodiments;

FIG. 14 illustrates an example circuit model of the metasurface unit cell according to some example embodiments;

FIG. 15 illustrates a chart of simulated scattering parameters of a metasurface unit cell according to some example embodiments;

FIG. 16 illustrates charts showing graphs indicative of operation of the metasurface unit cell at different capacitance values according to some example embodiments;

FIG. 17 illustrates charts of phase and amplitude maps determined based on a model of the metasurface unit cell according to some example embodiments;

FIG. 18 illustrates charts of phase and amplitude maps determined based on a experimentation involving the metasurface unit cell according to some example embodiments;

FIG. 19 illustrates charts of phase and amplitude maps determined based on a model of the metasurface unit cell according to some example embodiments;

FIG. 20 illustrates charts of phase and amplitude maps determined based on a experimentation involving the metasurface unit cell according to some example embodiments;

FIG. 21 illustrates charts of phase change over time and related constellation diagrams for various modulation schemes according to some example embodiments; and FIG. 22 illustrates a flowchart of a method for exhibiting an EMF response from a metasurface device according to some example embodiments.

DETAILED DESCRIPTION

Some non-limiting, example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. As used herein, operable coupling should be understood to relate to direct or indirect connection that, in either case, enables functional interconnection of components that are operably coupled to each other.

Following from the background above, some example embodiments described herein include a dynamic metasurface that is configured to be tuned for target applications to exhibit an electromagnetic field (EMF) response that is tailored for magnitude and phase. As used herein, an EMF response may be a reflection, transmission, or absorption of electromagnetic energy, where the metasurface operates to contribute to the EMF response. In this regard, a unit cell of a metasurface device may include, according to some example embodiments, two dynamic metasurface sub-cells structured in a cascaded configuration, and the sub-cells may operate, separately, as resonators to affect fields that couple to achieve desired response properties (e.g., reflection, transmission, or absorption properties) and a desired electromagnetic field (EMF) response. According to some example embodiments, a cascaded configuration may be one where the sub-cells are aligned and physically coupled to each other, and, possibly also physically coupled to a common substrate, a common ground plane, a common printed circuit board (PCB), or the like. To be dynamic, the metasurface sub-cells may include variable impedance elements that can be controlled to modify the response properties of the metasurface device. Such variable impedance elements may be controlled, for example, to change capacitance or inductance to realize a modification to the impedance of the metasurface sub-cell. While a number of components may be used to implement such a controlled variable impedance, according to some example embodiments, a varactor diode or varicap may be used. In this regard, by changing the voltage biasing of the varactor diode, the capacitance of the varactor diode may be changed, thereby changing the impedance of the metasurface sub-cell and the sub-cell's response properties.

As such, control circuitry may be implemented to control the impedance of the variable impedance elements (e.g., via provision of control signals to be used, for example, as biasing voltages) to exhibit desired response properties for the metasurface device. According to some example embodiments, the coupling of the fields from the cascaded sub-cells and the ability to control of the impedance of the sub-cells may permit both the magnitude and phase to be independently tuned, which is particularly useful in communications modulations methods.

While, according to some example embodiments, a unit cell of a metasurface device may include two cascaded, dynamic sub-cells, example embodiments of a metasurface device may have any number of cells structured as cascaded layers of cells. In other words, a plurality of a two-dimensional metasurfaces included of metasurface cells according to some example embodiments, may be constructed in a cascaded configuration and controlled to output a desired EMF response for the metasurface device. According to some example embodiments, a connectivity interface may be implemented in support of a certain control scheme. In this regard, for example, a control scheme may be implemented with an associated connectivity interface to permit each, individual cell to be controlled. Alternatively, according to some example embodiments, a control scheme may be implemented with an associated connectivity interface that supports control of the cells on a cell or sub-cell layer basis. In other words, a connectivity interface may be structured to electrically connect common nodes for each of the unit cells on a given cell layer, and, as such, each cell on that cell layer may be controlled in the same manner. Alternatively, according to some example embodiments, a control scheme and connectivity interface may be implemented that causes, for example, all cells (regardless of position or layer) of the metasurface device to operate in a common manner. As such, a variety of control schemes may be implemented, which may include the schemes that individually control cells differently, schemes that define groups of cells as super cells that are controlled in a common manner or in a uniquely coordinated manner, schemes that define cells as function of their spatial positioning, such as rings or loops of cells, concentric or nested rings or loops of cells, or the like. In this regard, it is understood that by having cells with individual addressability provides the most flexibility for implementing control schemes and even control schemes that may change as a function of time. However, to minimize cost of construction, for example, the structure of the connectivity interface 130 may be designed to implement the control schemes that are appropriate for a specific application. In other words, given a particular application, it may be determined that a more simplified control scheme and connectivity interface may be sufficient for the application and therefore certain costs and complexities of the metasurface device may be avoided.

According to some example embodiments, the implementation of a metasurface system that includes a metasurface device and control circuitry that is capable of tuning both a phase and magnitude response of the device may be used in a variety of contexts. In this regard, the metasurface system may be configured to operate in the radio-frequency (RF) spectrum as, for example, a communications device. Moreover, reconfigurable intelligent surfaces can be realized that are valuable for microwave imaging, beam steering reflectarrays, tunable RF lenses, wireless power transfer, and next-generation adaptive antennas.

Some example embodiments of metasurface devices described herein may operate to manipulate electromagnetic fields by leveraging a metal patterned layer that relies on subwavelength patterning to realize a tailored EMF response. Moreover, while bulk material properties of a two-dimensional (2D) metasurface have a clear impact on the operation of a metasurface device, the surface impedance or a collection of polarizabilities or susceptibilities of the metasurface device may also have a significant impact on the operation of the device. Accordingly, such a description of the metasurface may be used to facilitate, for example, a more simplified approach to both modeling and fabrication. According to some example embodiments, a hybrid modeling and fabrication approach may be used where several cell layers of 2D metasurfaces, as described herein, are cascaded to provide more robust control while avoiding the complications of volumetric fabrication. Such cascaded metasurfaces, according to some example embodiments, may also be implemented as Huygens' metasurfaces to balance electric and magnetic dipole moments and create a robust physics layer that brings electromagnetic equivalence principles into practice.

According to various example embodiments, the inclusion of multiple controllable sub-cells of a metasurface cell may create additional degrees of freedom for the behavior of a metasurface device. Using these degrees of freedom in implementation of example embodiments, the phase and magnitude response of a metasurface can be separately tuned. Due to the inherent coupling of the magnitude and phase in a passive resonator implementation, significant design constraints arise when attempting to perform such tuning in a passive implementation. Moreover, such passive implementations do not provide any dynamic capability for in situ modification of the response of a metasurface. Given their passive nature, such passive resonator implementations are also subject to Kramers-Kronig relations, which fundamentally limit the device's bandwidth performance. Accordingly, the added versatility of, for example, a multilayered dynamic metasurface device, according to some example embodiments, is well suited to address the need for magnitude and phase tuning, while also allowing for thin and convenient form factor construction.

As mentioned above, according to some example embodiments, a metasurface device may be constructed that is built on cascaded, dynamic metasurfaces having a unit cell that includes two sub-cell layers and, therefore, two tunable resonances. The two resonances of the unit cell may be separately controlled by a control signal provided to each of the sub-cells. In some example embodiments, each sub-cell may receive a control signal, which may be individual to the sub-cell or shared with a number of sub-cells. According to some example embodiments, respective desired voltages may be applied based on the control signals, which may be modified (similar to a knob implementation) to allow for enhanced control over magnitude and phase response. The control signals, according to some example embodiments, may be modulated or analog signals for dynamically controlling the sub-cells. According to some example embodiments, to provide improved control over the response magnitude, a series resistor may be included in the variable impedance elements of one of the sub-cell layers (as further described below), which may enable the ability to modify the response phase of the metasurface without affecting the response magnitude (and vice versa). Such behavior is favorable for a wide array of applications, e.g., holography and communications.

As such, according to some example embodiments, a cascaded dynamic metasurface with multiple control points is described that can provide augmented capabilities. By including multiple controls within a single metasurface or metasurface device, more degrees of freedom can be leveraged, and the increased degrees of freedom can be optimized, for example, jointly with the static geometry, to provide added functionality. According to some example embodiments, a system with a plurality of cascaded dynamic sub-cells is provided, where each dynamic sub-cell layer possesses tunable elements, referred to herein as variable impedance elements. Such tunable elements may operate in collaboration with, for example, patch-like elements that can be tuned with, for example, a varactor diode. According to some example embodiments, a resistor may also be included to add asymmetry in any resonance loss provided by each layer. Additionally, in consideration of the structure, response properties of the metasurface can be monitored to implement an ability to independently tune a magnitude and a phase from the single, in some cases, electrically thin surface. Tuning the magnitude and phase separately, a widely sought-after behavior, can be implemented, as described herein, in multiple communications modulation methods including phase-shift keying and 16-point quadrature amplitude modulation.

Having described some aspects of example embodiments, reference is now made to FIG. 1, which illustrates a block diagram of a metasurface system 10 that includes control circuitry 20, a control interface 30, and a metasurface device 40, according to some example embodiments. As provided above, the metasurface device 40 may include a dual resonance unit cell that is constructed using cascaded sub-cells that may be independently and dynamically controlled to exhibit a desired EMF response via controllable field coupling between the sub-cells. The control interface 30 may provide a connection system for delivering control signals from the control circuitry 20 to the metasurface device 40 to control the operation of the metasurface device 40. Such control signals may be, for example, modulated signals used in the control of the metasurface device 40. Depending on the control scheme that is being implemented for a given metasurface device 40, the control interface 30 may be configured to support delivery of discrete control signals to, for example, individual sub-cells of each unit cell of the metasurface device 40, a plurality of sub-cells or cell layers of the metasurface device 40, or all sub-cells or metasurface cells of the metasurface device 40.

Accordingly, based on the number of individual control signals required for a given implementation, the control circuitry 20 may be configured to output the respective control signals to the control interface 30 for delivery to the metasurface device 40. According to some example embodiments, the control circuitry 20 may be configured to receive inputs, for example, from a communications interface or a user interface and perform responsive actions, based on the inputs, such as provide outputs in the form of control signals to the metasurface device 40. The control circuitry 20 may be electronic circuitry configured to selectively output control signals for use in operating the metasurface device 40 for a given application. The control circuitry 20 may be disposed on a common board or within a common housing with the metasurface device 40. Although not shown in FIG. 1, the control circuitry 20 may be include a power source and may also include a higher-level control interface that may permit the metasurface system 10 to be a controllable by a separate system, such as a communications system, an experiment test system, or the like.

According to some example embodiments, the control circuitry 20 may be embodied as a single integrated circuit including processing circuitry with one or more processors 22 (or processor cores) and memory 24. The control circuitry 20 may be embodied as a circuit chip (e.g., an integrated circuit chip, such as a field programmable gate array (FPGA), an application specific integrated circuit (ASIC), or the like) configured (e.g., with hardware, software, or a combination of hardware and software) to perform operations described with respect to the control circuitry 20 provided herein. According to some example embodiments, the control circuitry 20 may be configured to execute instructions stored in the memory or otherwise accessible to the control circuitry 20. As such, whether configured by hardware or by a combination of hardware and software, the control circuitry 20 may represent an entity (e.g., physically embodied in circuitry—in the form of control circuitry) capable of performing operations according to example embodiments while configured accordingly. Thus, for example, when the control circuitry 20 is embodied by or includes an ASIC, FPGA, or the like, the control circuitry 20 may be specifically configured hardware for conducting the operations described herein. Alternatively, as another example, when the control circuitry 20 is embodied as an executor of software instructions, the instructions may specifically configure the control circuitry 20 to perform the operations described herein. According to some example embodiments, the control circuitry 20 may include one or more physical packages (e.g., chips) including materials, components, wires, or the like on a structural assembly (e.g., a baseboard). Further, in some example embodiments, the control circuitry 20 may be a configuration of components including some analog components, such as, for example, analog filters and modulators. Further, operational amplifiers and other passive components, such as resistors and capacitors, may also be included to support the operation and functionalities performed by the control circuitry 20 as described herein. According to some example embodiments, the control circuitry 20 may be configured to perform signal conditioning and processing using either analog or digital techniques.

In some example embodiments, the memory 24 of the control circuitry 20 may include one or more non-transitory memory devices such as, for example, volatile or nonvolatile memory that may be either fixed or removable. The memory may be configured to store information, data, applications, instructions or the like for enabling, for example, execution of procedures and the like to carry out various functions in accordance with example embodiments. For example, the memory 24 could be configured to buffer input data for processing by, for example, the processing circuitry of the control circuitry 20. Additionally or alternatively, the memory 24 may be configured to store instructions for execution by the control circuitry 20. Among the contents of the memory, applications may be stored for execution by the control circuitry 20 in order to carry out the functionality associated with a given application.

Referring now to FIGS. 2 to 6, an example embodiment of a metasurface unit cell 100 is provided. FIG. 2 illustrates a cross-sectional view of an example metasurface unit cell 100. FIG. 3 illustrates an exploded perspective view of the metasurface unit cell 100. FIG. 4 illustrates example connectivity interface 130 that may be used with the metasurface unit cell 100. FIG. 5 illustrates a perspective view of a top side of the metasurface unit cell 100 such that the patterned layer 110 of the metasurface sub-cell 101 is visible. FIG. 6 illustrates a perspective view of a bottom side of the metasurface sub-cell 102 with in the patterned layer 150 of the metasurface sub-cell 102 being visible.

The example metasurface unit cell 100 may be, for example, a component of the metasurface device 40, which may, according to some example embodiments, have one or more metasurface unit cells arranged in a variety of structural configurations. In this regard, according to some example embodiments, the metasurface unit cell 100 may be a dual-resonance unit cell that operates based on the coupling of two resonance fields that result from the cascaded metasurface sub-cells 101 and 102. According to some example embodiments, the metasurface sub-cells may be considered cascaded because the sub-cells are stacked with one over the other in an overlapped configuration. According to some example embodiments, the metasurface sub-cells 101 and 102 may be cascaded such that a patterned layer of each of the sub-cells is disposed on different parallel planes. Further, according to some example embodiments, the patterned layers of each of the metasurface sub-cells of the metasurface unit cell 100 may be aligned such that a center line 190 that passes through a centroid 191 of the patterned layer 110 of the metasurface unit cell 100 and a centroid of the patterned layer 150 of the metasurface unit cell 100 may be perpendicular to respective planes of the patterned layer 110 and the patterned layer 150. As such, the cascaded metasurface sub-cells 101 and 102 may be aligned and parallel with each other to exhibit interacting EMF responses that allow for control of both the magnitude and phase of the integrated, overall EMF response of the metasurface unit cell 100. According to some example embodiments, the metasurface sub-cells 101 and 102 may be constructed, for example, on opposite sides of a printed circuit board (PCB).

The metasurface unit cell 100 may therefore include a metasurface sub-cell 101 (e.g., a first metasurface sub-cell), a metasurface sub-cell 102 (e.g. a second metasurface sub-cell), a connectivity interface 130, a spacer layer 160, and a ground plane 170. The metasurface sub-cell 101 may include a patterned layer 110 (e.g., first patterned layer) and a dielectric layer 120 (e.g., first dielectric layer). The metasurface sub-cell 102 may include a dielectric layer 140 (e.g., second dielectric layer) and a patterned layer 150 (e.g., second patterned layer). With respect to the example embodiment of the metasurface unit cell 100, the layers from top to bottom, as best seen in FIG. 2, may be disposed with the patterned layer 110 disposed on the dielectric layer 120, the dielectric layer 120 disposed on the connectivity interface 130, the connectivity interface 130 disposed on the dielectric layer 140, the dielectric layer 140 disposed on the patterned layer 150, the patterned layer 150 disposed on the spacer layer 160, and the spacer layer 160 disposed on the ground plane 170. As such, the connectivity interface 130 may be disposed between the metasurface sub-cell 101 and the metasurface sub-cell 102 to provide, for example, accessibility for connectivity.

Accordingly, the metasurface sub-cell 101 and the metasurface sub-cell 102 may be constructed or disposed on the spacer layer 160 and the ground plane 170. In this regard, the spacer layer 160 and the ground plane 170 may embody a backplane or substrate for the metasurface sub-cells 101 and 102. The spacer layer 160 may include a dielectric material that has sufficient insulating properties, based on the type of material used and the thickness of the material used, to isolate the ground plane 170 from, for example, the patterned layer 150 of the metasurface sub-cell 102 and the other components of the metasurface sub-cell 101 and the metasurface sub-cell 102. The ground plane 170 may operate as a convenient current sink and as a backplane shielding element for certain EMF emissions. According to some example embodiments, the ground plane 170 may be formed as a conductive sheet that spans the base of the metasurface unit cell 100. The ground plane 170 may, according to some example embodiments, be formed of a metal, such as, for example, copper.

As mentioned above, the metasurface unit cell 100 may include the metasurface sub-cell 101 and the metasurface sub-cell 102. In the example embodiment of the metasurface unit cell 100, the metasurface sub-cell 101 includes a patterned layer 110, a plurality of variable impedance elements (e.g., variable impedance elements 112 and 114), and a dielectric layer 120. The patterned layer 110 may be, for example, an etched, stamped, or cut layer of metal having a desired architecture for exhibiting an EMF response in the form of a resonance field for the metasurface sub-cell 101. According to some example embodiments, the patterned layer 110 may be formed of copper, aluminum, gold, a conductive alloy, a conductive composite material, or the like. According to some example embodiments, the architecture of the patterned layer 110 may include two electrically separate regions or portions that are electrically connected via the variable impedance elements.

In this regard, the patterned layer 110 may include an outer portion 111 and an inner portion 115. According to some example embodiments, the outer portion 111 may be a perimeter conductive band or trace for the patterned layer 110. While the outer portion 111 is shown as being a rectangular perimeter band in FIGS. 3 and 5, it is understood that the shape and architecture of the outer portion 111 may be different, such as a circular shape that may but need not conform the perimeter shape of the dielectric layer 120. According to some example embodiments, the outer portion 111 may be discontinuous such that the outer portion 111 includes a gap, as with a C or U-shaped outer portion 111. The patterned layer 110 may also include an inner portion 115, which may be shaped in a variety of ways and with a variety of dimensions and areas dependent upon a desired EMF response for the metasurface sub-cell 101. According to some example embodiments, the inner portion 115 may have dimensions that are less than a target wavelength for the metasurface unit cell 100. In this regard, example shapes for the inner portion 115 may include a patch shape (e.g., a rectangular shape) that is centrally positioned as shown in FIGS. 3 and 5. However, other shapes for the inner portion 115 may include a plus-sign shape, and X-shape, a circular shape, a ring shape, a non-radially symmetric shape, or the like.

According to some example embodiments, the outer portion 111 or the inner portion 115 may include a plurality of leads that extend from one of the portions to the other of the portions to facilitate connectivity of the variable impedance elements between the outer portion 111 and the inner portion 115. In this regard, the metasurface sub-cell 101 may include a plurality of variable impedance elements. In the example embodiment of metasurface sub-cell 101, four variable impedance elements 112, 114, 116, and 118 are included. As shown in FIG. 2 and FIG. 5, the variable impedance elements 112, 114, 116, and 118 may be electrically connected between the outer portion 111 and the inner portion 115. The variable impedance elements 112, 114, 116, and 118 may be affixed (e.g., soldered) into place on the patterned layer 110. According to some example embodiments, the connections or feeds between the outer portion 111 and the inner portion 115 that includes the variable impedance elements 112, 114, 116, and 118 may be symmetrically positioned around the inner portion 115. However, it is understood that other positioning may be utilized based on the design of the patterned layer. Moreover, while the metasurface sub-cell 101 includes four variable impedance elements, it is understood that example embodiments may include more or less variable impedance elements.

As mentioned above, the variable impedance elements 112, 114, 116, and 118 may be controllable to modify an impedance of the element and thereby change the impedance and EMF response of the metasurface sub-cell 101. The variable impedance elements 112, 114, 116, and 118 may include one or more components that are collectively configured to perform the functionality of impedance modification. In this regard, according to some example embodiments, each variable impedance elements 112, 114, 116, and 118 may include a variable reactance element that is configured to controllably modify the capacitance or inductance of the variable reactance element. In this regard, according to some example embodiments, the variable reactance element may be controlled via a control connection (e.g., a gate connection) as a three terminal element. Alternatively, the variable reactance element may be two terminal element that is controlled via, for example, voltage biasing (e.g., reverse biasing) across the two terminals. In this regard, for example, according to some example embodiments, each variable impedance element 112, 114, 116, and 118 may include a varactor diode or a varicap. The varactor diode may have a controllable capacitance based on voltage biasing provided to the varactor diode as a control signal (e.g., from the control circuitry 20). According to some example embodiments, the implementation of varactor diodes may be beneficial due to an ability to tune the capacitance while drawing minimal current, which can support the feasible construction and operation of large arrays of metasurface cells operating at relatively high frequencies. In this regard, according to some example embodiments, the capacitance of the varactor diode may vary as a function of the reverse voltage biasing that is applied to the varactor diode. As such, the changes to the capacitance of the varactor diode result in changes to the impedance of the metasurface sub-cell 101, thereby modifying the resonance of the metasurface sub-cell 101 and the EMF response of the metasurface sub-cell 101.

Use of a varactor diode is just one example of a component that may be included in, or embodied by, a variable impedance element, such as variable impedance elements 112, 114, 116, and 118, to change the impedance of the device. According to some example embodiments, the variable impedance element may include other components that facilitate the ability to dynamically change the impedance of the device. In this regard, for example, a liquid crystal device may be included in some example embodiments. Additionally or alternatively, a p-i-n diode may be included in a variable impedance element in some example embodiments. Moreover, a phase change material may be additionally or alternatively included for changing impedance according to some example embodiments. In some example embodiments, a piezo device may additionally or alternatively included according to some example embodiments. According to some example embodiments, the variable reactance element may be a switchable device that may be controlled to introduce a binary (two states) or a non-binary (many states) change to the impedance (i.e., reactance or resistance) of the device. In this regard, for example, a micro-electromechanical system (MEMS) device may be employed to control impedance. As such, according to some example embodiments, combinations of active and passive components may be included in a variable impedance device. For example, a switching element (e.g., a switch, transistor, selector, multiplexer, etc.) having two or more connectivity states may switchably introduce static or variable reactance or resistance devices into electrical connection to introduce different impedance states.

According to some example embodiments, the variable impedance elements 112, 114, 116, and 118 may include components that have resistive properties. According to some example embodiments, the variable impedance elements 112, 114, 116, and 118 may include or be embodied by a variable resistor that may be controlled to change the impedance of the metasurface sub-cell 101 as a change in resistance. According to some example embodiments, rather than a continuous change variable resistor, a variable resistor may be included that supports discrete, step value changes as a "lump" resistance change to support tuning. In this regard, according to some example embodiments, a control signal may include component control signals to thereby control particular components of a variable impedance element (e.g., a first component control signal for a varactor of a variable impedance element and a second component control signal for a variable resistor of the same variable impedance element). In some example embodiments, the variable impedance elements 112, 114, 116, and 118 may include a fixed-value resistor connected, for example, in series with a variable reactance element. The incorporation of the fixed-value resistor may be determined based on a desired EMF response for the metasurface unit cell 100 in consideration of the effects of the EMF response provided by the metasurface sub-cell 102. As such, due to the coupling of the fields resulting from the metasurface sub-cell 101 and the metasurface sub-cell 102, the component selection may be interrelated, requiring consideration of their aggregate operational effects.

The dielectric layer 120 of the metasurface sub-cell 101 may be formed of a dielectric material that, for example, is an insulator to the patterned layer 110 and may separate the patterned layer 110 from the connectivity interface 130. The dielectric layer 120 may include a material and have a thickness that supports the operation of the metasurface sub-cell 101. In this regard, the dielectric layer 120 may be configured to affect the EMF response of the metasurface sub-cell 101 and the metasurface sub-cell 102.

With respect to the metasurface sub-cell 102, the dielectric layer 140 may be structured in a same or similar manner as the dielectric layer 120, but positioned, for example, between the connectivity interface 130 and the patterned layer 150. Similar to the dielectric layer 120, the dielectric layer 140 may operate as insulator to the patterned layer 150 and may separate the patterned layer 150 from the connectivity interface 130. Additionally, the dielectric layer 140 may be configured to affect the EMF response of the metasurface sub-cell 102 and the metasurface sub-cell 101 similar to the dielectric layer 120.

The patterned layer 150 may be structured in a similar manner to the patterned layer 110. According to some example embodiments, the patterned layer 150 may be shaped in the same manner as the patterned layer 110. However, according to some example embodiments, the patterned layer 150 may be shaped differently to exhibit a desired resonance and EMF response for the metasurface sub-cell 102. Accordingly, the material and shape options for the patterned layer 150 may be same as those for the patterned layer 110 described above. In this regard, according to some example embodiments, the patterned layer 150 may include an outer portion 151 and an inner portion 155. Notably, with respect to the example embodiment of the patterned layer 150, the area of the inner portion 155 may be, for example, larger than the area of the inner portion 115, as best seen in FIG. 3.

Similar to the metasurface sub-cell 101, the metasurface sub-cell 102 may also include a plurality of variable impedance elements that may connected between the outer portion 151 and the inner portion 155. Similar to the patterned layer 110, the patterned layer 150 may include leads or traces that facilitate connecting the variable impedance elements between the outer portion 151 and the inner portion 155. In the example embodiment of metasurface sub-cell 102, four variable impedance elements 152, 154, 156, and 158 are included. As shown in FIG. 2 and FIG. 6, the variable impedance elements 152, 154, 156, and 158 may be electrically connected between the outer portion 151 and the inner portion 155. The variable impedance elements 152, 154, 156, and 158 may be affixed (e.g., soldered) into place on the patterned layer 150. According to some example embodiments, the connections or feeds between the outer portion 151 and the inner portion 155 that include the variable impedance elements 152, 154, 156, and 158 may be symmetrically positioned around the inner portion 155. However, it is understood that other positioning may be utilized based on the design of the patterned layer. Moreover, while the metasurface sub-cell 102 includes four variable impedance elements, it is understood that example embodiments may include more or less variable impedance elements.

Similar to the variable impedance elements of the metasurface sub-cell 101, the variable impedance elements 152, 154, 156, and 158 may be controllable to modify an impedance of the element and thereby change the EMF response of the metasurface sub-cell 102. The variable impedance elements 152, 154, 156, and 158 may include one or more components that are collectively configured to perform the functionality of impedance modification. In this regard, according to some example embodiments, each variable impedance element 152, 154, 156, and 158 may include a variable reactance element that is configured to controllably modify the capacitance or inductance of the variable reactance element. In this regard, according to some example embodiments, the variable reactance element may be controlled via a control connection (e.g., a gate connection) as a three terminal element. Alternatively, the variable reactance element may be two terminal element that is controlled via, for example, voltage biasing (e.g., reverse biasing). In this regard, for example, according to some example embodiments, each variable impedance element 152, 154, 156, and 158 may include a varactor diode or a varicap. As mentioned above, the varactor diode may have a controllable capacitance based on voltage biasing provided to the varactor diode as a control signal (e.g., from the control circuitry 20). In this regard, according to some example embodiments, the capacitance of the varactor diode may vary as a function of the reverse voltage biasing that is applied to the varactor diode. As such, the changes to the capacitance of the varactor diode may result in changes to the impedance of the metasurface sub-cell 102, thereby modifying the resonance of the metasurface sub-cell 102 and the EMF response of the metasurface sub-cell 102.

Use of a varactor diode is just one example of a component that may be included in, or embodied by, a variable impedance element, such as variable impedance elements 152, 154, 156, and 158, to change the impedance of the device. According to some example embodiments, the variable impedance element may include other components that facilitate the ability to dynamically change the impedance of the device. In this regard, for example, a liquid crystal device may be included in some example embodiments. Additionally or alternatively, a p-i-n diode may be included in a variable impedance element in some example embodiments. Moreover, a phase change material may be additionally or alternatively included for changing impedance according to some example embodiments. In some example embodiments, a piezo device may additionally or alternatively included according to some example embodiments. According to some example embodiments, the variable reactance element may be a switchable device that may be controlled to introduce a binary (two states) or a non-binary (many states) change to the impedance (i.e., reactance or resistance) of the device. In this regard, for example, a micro-electromechanical system (MEMS) device may be employed to control impedance. As such, according to some example embodiments, combinations of active and passive components may be included in a variable impedance device. For example, a switching element (e.g., a switch, transistor, selector, multiplexer, etc.) having two or more connectivity states may switchably introduce static or variable reactance or resistance devices into electrical connection to introduce different impedance states.

According to some example embodiments, the variable impedance elements 152, 154, 156, and 158 may include components that have resistive properties. According to some example embodiments, the variable impedance elements 152, 154, 156, and 158 may include or be embodied by a variable resistor that may be controlled to change the impedance of the metasurface sub-cell 101 as a change in resistance. According to some example embodiments, rather than a continuous change variable resistor, a variable resistor may be included that supports discrete, step value changes as a "lump" resistance change to support tuning. In this regard, according to some example embodiments, a control signal may include component control signals to thereby control particular components of a variable impedance element (e.g., a first component control signal for a varactor of a variable impedance element and a second component control signal for a variable resistor of the same variable impedance element). In some example embodiments, the variable impedance elements 152, 154, 156, and 158 may include a fixed-value resistor connected, for example, in series with a variable reactance element. The incorporation of the fixed-value resistor may be determined based on a desired EMF response for the metasurface unit cell 100 in consideration of the effects of the EMF response provided by the metasurface sub-cell 101. As such, due to the coupling of the fields resulting from the metasurface sub-cell 102 and the metasurface sub-cell 101, the component selection and operation may be interrelated, requiring consideration of the aggregate effects.

According to some example embodiments, the variable impedance elements of the metasurface sub-cell 101 may be the same or different from the variable impedance elements of the metasurface sub-cell 102. In this regard, according to some example embodiments, the variable impedance elements 112, 114, 116, and 118 may be, for example, single component devices embodied as a varactor diode. However, the variable impedance elements 152, 154, 156, and 158 may be different and need not be embodied by or include a varactor diode. In the example embodiments of the metasurface unit cell 100, the variable impedance elements 152, 154, 156, and 158 may be embodied as a varactor diode connected in series with a fixed-value resistor. As can be best seen in FIG. 6, the variable impedance element 152 may include a varactor diode 52 and a resistor 53, the variable impedance element 154 may include a varactor diode 54 and a resistor 55, the variable impedance element 156 may include a varactor diode 56 and a resistor 57, and the variable impedance element 158 may include a varactor diode 58 and a resistor 59. As further described below, the inclusion of the fixed-resistance can operate to differentiate the effective control signals (i.e., change the voltage bias across the varactor diodes 52, 54, 56, and 58 relative to the voltage bias across the variable impedance elements 112, 114, 116, and 118 embodied as varactor diodes, when the same control signal is provided to both the patterned layer 110 and the patterned layer 150). In other words, rather than delivering dedicated control signals to the metasurface sub-cell 101 and the metasurface sub-cell 102, the incorporation of differing variable impedance elements between the sub-cells can operate to effectively differentiate the control signals that are acted upon by the sub-cells, as further described below.

In addition to the other design parameters described herein, the distance 105 may be a design parameter for the metasurface unit cell 100. In this regard, according to some example embodiments, a desired wavelength or range of wavelengths may be targeted for the operation of the metasurface unit cell 100 and the EMF response of the metasurface unit cell 100. The distance 105 between the metasurface sub-cell 101 and the metasurface sub-cell 102 may be factor that affects the EMF response. More specifically, according to some example embodiments, the distance 105 between the patterned layer 110 and the patterned layer 150 may be a factor that affects the EMF response. According to some example embodiments, the distance 105 may be selected to cause coupling between the EMF response exhibited by the metasurface sub-cell 101 and the metasurface sub-cell 102. According to some example embodiments, the distance 105 may cause near-field coupling between the metasurface sub-cell 101 and the metasurface sub-cell 102. Moreover, the distance 105 may be a function of the desired wavelength or range of wavelengths (e.g., one-quarter the length of the desired wavelength or one-quarter the length of a center wavelength).

As mentioned above, the metasurface unit cell 100 may also include a connectivity interface 130. In general, the connectivity interface 130 may be configured to provide electrical connectivity between the control circuitry 20 and the metasurface unit cell 100 for the delivery of control signals via the control interface 30. According to some example embodiments, the connectivity interface 130 may include one or more layers of connection traces and interlayer vias to form electrical connections between inputs, outputs, and components of the metasurface unit cell 100. In this regard, according to some example embodiments, the metasurface unit cell 100 may include a printed circuit board (PCB). The top surface of the PCB may include the patterned layer 110 with the variable impedance elements 112, 114, 116, and 118 affixed thereto, which is disposed on the dielectric layer 120 as the top dielectric layer of the PCB. The bottom surface of the PCB may include the patterned layer 150 with the variable impedance elements 152, 154, 156, and 158 affixed thereto, which is disposed on the dielectric layer 140 as the bottom dielectric layer of the PCB. The connectivity interface 130 may be disposed in one or more layers between the top dielectric layer and the bottom dielectric layer of the PCB. For simplicity of the drawings, the individual, discrete connectivity paths between the various components is not specifically shown. However, one of ordinary skill in the art would understand that single and multilayer PCB design can be used to route connections to various components on a board to support operation of the device that include the board.

The connectivity interface 130 may therefore operate to deliver control signals to desired connection points on the patterned layer 110 and the patterned layer 150. More specifically, the connectivity interface 130 may be configured to deliver control signals to the variable impedance elements to control the operation of the variable impedance elements to tune the EMF response of the metasurface unit cell 100. As such, where the variable impedance elements are, for example, three terminal elements, the connectivity interface 130 may be configured to deliver signals to a control terminal of the three-terminal variable impedance element. However, in example embodiments where the variable impedance elements are two terminal devices, the connectivity interface 130 may be configured to deliver control signals in the form of, for example, a voltage biasing across the two-terminal variable impedance element.

The example embodiment of metasurface unit cell 100 includes two-terminal variable impedance elements and therefore the connectivity interface 130 may be configured to connect to the patterned layer 110 and patterned layer 150 to apply a desired bias voltage across the variable impedance elements. In this regard, according to some example embodiments, for each control signal that is provided to the metasurface unit cell 100, the control circuitry 20 may output the respective control signal and the control interface 30 may include a conductor that delivers the respective control signal to the connectivity interface 130 for isolated delivery to one or more components of the metasurface unit cell 100. Moreover, as used herein, the application of a control signal may be a signal that is applied across two terminals of a component to, for example, apply a voltage bias to the component. Accordingly, a first potential may be applied by the connectivity interface 130 to the inner portion 115 through the via 132 (and connection point 113) and a second potential may be separately applied to the outer portion 111 either by a trace disposed on the patterned layer 110 or through the via 131 by the connectivity interface 130. As such, a control signal in the form of a voltage bias across the variable impedance elements 112, 114, 116, and 118 may be applied using the connectivity interface 130. Moreover, a third potential may be applied by the connectivity interface 130 to the inner portion 155 through the via 134 (and connection point 153) and a fourth potential may be separately applied to the outer portion 151 either by a trace disposed on the patterned layer 150 (which may be connected through a via to the patterned layer 110) or through the via 133 by the connectivity interface 130. As such, a control signal in the form of a voltage bias across the variable impedance elements 152, 154, 156, and 158 may be applied using the connectivity interface 130. As mentioned above, according to some example embodiments, the same control signal may be applied to the patterned layer 110 and the patterned layer 150, but the differences in the configurations of the metasurface sub-cell 101 and the metasurface sub-cell 102 may result in differing EMF responses from the respective sub-cells. As such, for example, if the variable impedance elements 152, 154, 156, and 158 include a fixed-resistance that is not included in the variable impedance elements 112, 114, 116, and 118, then the difference in the structures may result in a desired EMF response for the metasurface unit cell 100, while simplifying the architecture of the connectivity interface 130. Therefore, according to some example embodiments, to apply a desired voltage bias to both the variable impedance elements 112, 114, 116, and 118 and the variable impedance elements 152, 154, 156, and 158, a first potential may be applied to both the inner portion 115 and the inner portion 155 through, for example, vias 132 and 134, respectively, of the connectivity interface 130. Similarly, a second potential may be applied to both the outer portion 111 and the outer portion 151 through, for example, connection traces on the patterned layer 110 and/or the patterned layer 150 or through the vias 131 and 133, respectively, of the connectivity interface 130. In this manner, the same control signal may be leveraged for both the metasurface sub-cell 101 and metasurface sub-cell 102.

Referring specifically to FIG. 4, the example connectivity interface 130 is shown. The connectivity interface 130 may be configured for use with the example metasurface unit cell 100 where the connection to the outer portions 111 and 151 are made directly by a trace on, for example, the patterned layer 110. As such, the connectivity interface 130 may be configured to provide connectivity to deliver a control signal to the inner portion 115 and/or inner portion 155. Accordingly, the trace 180 may extend from the corners of the shape of the connectivity interface 130 and converge at a central point 182, thereby creating an X-shape. The trace 180 may be defined in accordance with a variety of different shapes, such as the X-shape of FIG. 4, a rectangular patch, or the like. The conductivity of the material of the trace 180 may couple to the fields existing within and provided by the metasurface unit cell 100. According to some example embodiments, the trace 180 may contribute as a shunt inductance to the metasurface unit cell 100 and, as such, the operation of the metasurface unit cell 100 may be a function of the structure of the trace 180. Further, at the central point 182, a via may connect the trace 180 to the inner portion 115 and/or inner portion 155. Dielectric regions 181 may define boundaries of the trace 180. According to some example embodiments, a connection to, for example, the control interface 30, may be made at one or more of the corners of the trace 180, and a control signal provided to the trace 180 may be delivered to the inner portion 115 and/or the inner portion 155 through respective connecting vias.

Now referring to FIG. 7, a metasurface system 107 including the control circuitry 20, the control interface 30, and the metasurface unit cell 100. The metasurface system 107 may be similar to the metasurface system 10, with the additional detail of the cross-sectional view of the metasurface unit cell 100. From FIG. 7, it can be seen that the control signals provided by the control circuitry 20, via the control interface 30, to the connectivity interface 130, and ultimately to the metasurface sub-cell 101 and the metasurface sub-cell 102 cause the metasurface unit cell 100 to exhibit an EMF response 210. As described above, the EMF response 210 may be a result of the combined effect of an EMF response exhibited by the metasurface sub-cell 101 under the control of the control circuitry 20 and an EMF response exhibited by the metasurface sub-cell 102 under the control of the control circuitry 20. By controlling the impedance of the metasurface sub-cell 101 and the metasurface sub-cell 102, the control circuitry 20 may be configured to cause the metasurface unit cell 100 to provide the EMF response 210 via a controllable magnitude and a controllable phase. To so, the control circuitry 20 may be configured to output a first control signal for delivery to the metasurface sub-cell 101 and a second control signal for delivery to the metasurface sub-cell 102. In some example embodiments, the first control signal may be different from the second control signal, and therefore the connectivity interface 130 may support delivery of the first control signal to the metasurface sub-cell 101 and separate delivery to the metasurface sub-cell 102. However, in some example embodiments, the first control signal and the second control signal may be same control signal, and, thus, the connectivity interface 130 may be configured to provide this same control signal to both the metasurface sub-cell 101 and the metasurface sub-cell 102. Regardless of the control signaling and the delivery mechanism, the ability to control both the magnitude and phase of the EMF response 210 of the metasurface unit cell 100 may find use in a variety of applications including communications applications.

The control signals provided by the control circuitry 20 may be conditioned in a number of different ways. For example, the control circuitry 20 may configured to output the control signals as modulated signals with, for example, a DC offset. Further, according to some example embodiments, the control signals may be provided in association with a binary phase-shift keying (BPSK) approach, a quadrature phase shift keying (QPSK) approach, or a 16-point quadrature amplitude modulation approach.

With reference to FIG. 8, a metasurface system 106' is shown including a metasurface unit cell 100', where the component layers are flexible. In this regard, the metasurface unit cell 100' may be structured in the same configuration and with the same layers and interfaces as the metasurface unit cell 100. However, the materials used to form the various layers may have a flexibility property that permits the metasurface unit cell 100' to contour to the shape of a surface that the metasurface unit cell 100' may be affixed to. As such, the patterned layer 110', the dielectric layer 120', the connectivity interface 130', the dielectric layer 140', the patterned layer 150', the spacer layer 160', and the ground plane 170' may be flexible. In this regard, because the structure of the metasurface unit cell 100' may be modified by the flexing into a different configuration, the EMF response of the metasurface unit cell 100' may be affected by the flexing. However, since the connectivity to the control circuitry 20, via the control interface 30, supports transmission of control signals to modify the behavior of metasurface unit cell 100', the changes caused by the flexing of the metasurface unit cell 100' may be compensated for by adjusting the control signals output by the control circuitry 20 to arrive at a desired EMF response for the metasurface unit cell 100'.

Having described some example embodiments involving the metasurface unit cell 100 in isolation, FIGS. 9 to 13B will now be described which involve multiple instances of the metasurface unit cell 100 within a metasurface device. The inclusion of multiple unit cells within a metasurface device may exhibit a more robust EMF response due to the cooperative interaction of many resonances being provided by the cells.

In this regard, FIG. 9 illustrates an example metasurface device 104 including two cells, i.e., cells 100 and 200 in a side-by-side configuration as an expansion of a two-dimensional surface in the x-y plane. As a result of the side-by-side architecture, the layers of the metasurface unit cell 100 may be extended for use with cell 200. According to some example embodiments, the cell 200 may be a replica of the cell 100. As shown in the cross-section view of FIG. 9, the cell 200 may include, on the patterned layer 110, an outer portion 211 connected to an inner portion 215 through variable impedance elements 212 and 214. Additionally, on the patterned layer 150, the cell 200 may include an outer portion 251 connected to an inner portion 255 through variable impedance elements 252 and 254. According to some example embodiments, the outer portion 111 and the outer portion 211 may be connected, and, as such, the outer portion 111 and the outer portion 211 may be a connected region between the inner portion 115 and the inner portion 215. Further, according to some example embodiments, the outer portion 151 and the outer portion 251 may be connected, and, as such, the outer portion 151 and the outer portion 251 may be a connected region between the inner portion 155 and the inner portion 255.

According to some example embodiments, the control circuitry 20 may be connected to the outer portion 111, the outer portion 211, the outer portion 151, and the outer portion 251 via a first conductor of the control interface 30 and connected to the connectivity interface 130 via a second conductor of the control interface 30. As such, to operate the metasurface device 104, the control circuitry 20 may be configured to provide a control signal in the form of a bias potential on the first conductor and a bias potential on the second conductor. Moreover, in the example embodiment shown in FIG. 9, a control signal may be provided by the control circuitry 20, via the control interface 30, to the connectivity interface 130. In this regard, according to some example embodiments, the connectivity interface 130 may include a single continuous trace (e.g., may have a single node) that is connected to each of the vias 132, 232, 134, and 234. As such, the control signal may be provided to the inner portion 115 through via 132, to the inner portion 215 through the via 232, to the inner portion 155 through the via 134, and to the inner portion 255 through the via 234.

According to some example embodiments, the variable impedance elements 212, 214, 252, and 254 may be controlled by control signals delivered via the connectivity interface 130 and the vias 231, 232, 233, and 234. According to some example embodiments, the control circuitry 20 may implement a control scheme for the metasurface device 104 that includes common control of the cell 100 and the cell 200. As such, the same control signal (e.g., a first control signal) may control the operation of the variable impedance elements 112, 114, 212, and 214, based on the structure of the connectivity interface 130. Similarly, according to some example embodiments, the same control signal may control the operation of the variable impedance elements 152, 154, 252, and 254, based on the structure of the connectivity interface 130. Further, according to some example embodiments, the same control signal may be leveraged to provide control to all of the variable impedance elements 112, 114, 212, 214, 152, 154, 252, and 254 based on the structure of the connectivity interface 130. Accordingly, the control circuitry 20 may be configured to implement layer control of the cells 100 and 200, since both cells may be commonly controlled and the cells are disposed on a common cell layer. Such an example configuration provides a simplified approach to biasing the variable impedance elements in a coordinated manner using minimal control signals that may be shared across numerous cells. Moreover, the connectivity interface 130 may provide for cell layer level control across an entire layer of cells (e.g., dual-resonance cells) that may be disposed in a side-by-side fashion, as further described with respect to example embodiments of FIGS. 11 and 12.

Now referring to FIG. 10, an example metasurface device 103 is illustrated. In this regard, the metasurface device 103 includes two cells, i.e., cells 100 and 300 in a stacked or cascaded configuration. As a result of the stacked architecture, according to some example embodiments, additional material layers may be disposed on the cell 100 to construct the cell 300. In this regard, according to some example embodiments, the material layers of the cell 300 may be the same or similar to the material layers of the cell 100. In this regard, the cell 300 may include two sub-cells. The material layers to construct the sub-cells may include a patterned layer 310, a dielectric layer 320, a connectivity interface 330, a dielectric layer 340, and a patterned layer 350. The patterned layer 310 may be the same or similar to the patterned layer 110. The dielectric layer 320 may be the same or similar to the dielectric layer 120. The connectivity interface 330 may be the same or similar to the connectivity interface 130. The dielectric layer 340 may be same or similar to the dielectric layer 140. Finally, the patterned layer 350 may be the same or similar to the patterned layer 150. Additionally, according to some example embodiments, a spacer layer 360, which may be same or similar to the spacer layer 160, may be dispose between the patterned layer 350 and the patterned layer 110 to isolate the cell 100 from the cell 300.

Similar to the example embodiment of FIG. 9, the outer portions of the patterned layers 310, 350, 110, and 150 may be connected, for example, via a common conductor of the control interface 30. Additionally, the inner portions of the patterned layers 310, 350, 110, and 150 may be connected together through the vias 332, 334, 132, and 134, the connectivity interfaces 130 and 330, and, for example, a common conductor of the control interface 30. Accordingly, the variable impedance elements 312, 314, 352, 354, 112, 114, 152, and 154 may be biased by a control signal from the control circuitry 20. In this example embodiment, two terminals of the control circuitry 20 may be used to bias all of the variable impedance elements of the metasurface device 103. However, according to some example embodiments, the control circuitry 20, the control interface 30, and the connectivity interfaces 130 and 330 may be configured differently to support, for example, individualized control of each cell or sub-cell with a dedicated control signal. Alternatively, according to some example embodiments, the control circuitry 20, the control interface 30, and the connectivity interfaces 130 and 330 may be configured differently to support, for example, individualized control of groups of cells or groups of sub-cells with dedicated control signals, where the groups may be defined as a layer of cells or sub-cells, a row of cells or sub-cells, or some other collection of cells or sub-cells.

In this regard, with reference to FIG. 11, an example metasurface system 400 is shown that includes a metasurface device 410, the control interface 30, and the control circuitry 20. The metasurface device 410 may include three layers of cells 450. Each of the cells 450 may be constructed in same or similar as the metasurface unit cell 100. Accordingly, the cell layers may include cell layer 420, 430, and 440. Each of the cell layers may include a connectivity interface 130. Additionally, each of the cell layers may include a spacer layer 160 that is either disposed between the cell layers or between a cell layer and the grounds plane 170.

As indicated by the conductors of the control interface 30, according to some example embodiments, each of the cell layers 420, 430, and 440 may be separately controlled by a respective control signal. As such, the EMF response from each of the cell layers 420, 430, and 440 may be different, even though the architectures of the cell layers 420, 430, and 440 may, for example, be the same. As described above, the combination of EMF responses from the sub-cells and cells of the metasurface device 410 may combine to exhibit a desired EMF response for the device 410. As an alternative to cell layer-based control, the control interface 30 and the connectivity interfaces 130 may be configured to permit any configuration for delivery of control signals. For example, each cell 450 of the metasurface device 410 may be individually addressable for delivery of a control signal. Alternatively, any combination of cells 450 may be connected in such as a manner as to be controlled together.

FIG. 12 illustrates a front surface of an example metasurface device 500 including a matrix array of cells 520 disposed on a PCB 510. Each of the cells 520 may include an inner portion 530 (e.g., a patch or a central patch) and an outer portion 550, which may be connected between all the cells 520. The PCB 510 may also include a connection region 540 where connections, for example, with the control interface 30 may be made to provide control signals to the cells. Accordingly the metasurface device 500 may be implemented to, for example, operate in gigahertz frequency ranges, according to some example embodiments. For example, based on the control scheme frequencies such as, for example, 2.9 GHz and 3.4 GHz may be used or ranges, such as, for example, 2.8 to 4.2 GHz may be implemented. Additionally, for example, the patch sizes (or the patterned layer structures) of the metasurface sub-cells may be determined based on the selected operation frequencies.

Now with reference to FIG. 13A, a patterned layer 600 is shown that may one of the pattern layers for a sub-cell of a cell 520 of the metasurface device 500. In this regard, the patterned layer 600 may include a perimeter trace 602 (e.g., the outer portion) and a patch 604 (e.g. the inner portion).

The perimeter trace 602 may be connected to the patch 604 via a lead 606 and a variable impedance element 608. According to some example embodiments, the patch 604 may include a central connection point 610, which may be aligned with a via for connectivity with the patch 604 to provide control signals to the patch 604.

FIG. 13B illustrates a patterned layer 601, which may be one of the pattern layers for a sub-cell of a cell 520 of the metasurface device 500. For example the patterned layer 601 may be disposed on an opposite side of the PCB 510 from the patterned layer 600. In this regard, the patterned layer 601 may include a perimeter trace 632 (e.g., the outer portion) and a patch 634 (e.g. the inner portion). The perimeter trace 632 may be connected to the patch 634 via a lead 624 and a variable impedance element 620. According to some example embodiments, the variable impedance element 620 may include two components 622 and 626 (e.g., a varactor diode and a resistor). According to some example embodiments, the patch 634 may include a central connection point 640, which may be aligned with a via for connectivity with the patch 634 to provide control signals to the patch 634.

Based on the forgoing, a metasurface unit cell 100 and associated control circuitry 20 have been described that, according to some example embodiments, enable in situ control of an EMF response exhibited by the metasurface unit cell 100 and a metasurface device 40 with respect to both magnitude and phase in real time. Conventional solutions offer magnitude-only or phase-only responses, and such conventional solutions may also incorporate an internal air gap that creates an undesirable increase in thickness and a high degree of losses. In contrast, some example embodiments described herein may be constructed to have a thickness that is less than 1/30 of the target wavelength, which can provide a single effective interface with reduced angular sensitivity. Moreover, in some example embodiments, only two biasing voltages may be required for controlling the metasurface unit cell 100, whereas some conventional solutions required more signals and biasing to perform lesser functionality. Additionally, as a contrast to some conventional solutions, the operation of some example embodiments may work in concert with a cooperative receiver, rather than directly on the incident signal, to deliver complex waveforms that, for example, emulate analog modulation.

Moreover, according to some example embodiments, a dynamic cascaded metasurface is provided that is configured to independently control a magnitude and phase for an EMF response. In this regard, some example embodiments are configured to dynamically tune two sub-cells independently for exhibiting a desired EMF response. According to some example embodiments, by changing, for example, only capacitances via the control of varactor diodes, continuous control of the resonance and loss of both fundamental modes can be realized. In this regard, the modification of sub-cell resonances can result in variation of the response magnitude and phase of the surface (e.g., the metasurface unit cell 100), and the control signals may operate to adjust the behavior of constituent components to achieve a desired response.

According to some example embodiments, the metasurface unit cell 100 may operate based on two degrees of freedom associated with respective control signals that support voltage biasing to control two resonant responses. Such biasing operates to control the impedance of a respective sub-cell, where the sub-cells may employ, for example, patch architectures and are cascaded or stacked. In this regard, when the two resonant modes are provided by the sub-cells of a metasurface unit cell with slightly different frequencies, the effects of the resonances may compound. Where the spectral response is dominated by one resonant mode, the EMF response may be primarily governed by that same resonant mode. However, when neither resonant mode is clearly dominant, the effects of both resonant modes may contribute to the response of the metasurface unit cell 100.

Referring now to FIG. 14, a simplified model 106 of the metasurface unit cell 100 is shown. The model 106 is a transmission-line model including two tunable sub-cells 107 and 108. The tunable sub-cells 107 and 108 may operate as shunt RLC circuit segments. The conductance of the connectivity interface 130 may contribute as a shunt inductance at 109. The dielectric and spacer layers may contribute as transmission-line segments 121, 122, and 123.

A coupled mode theory (CMT) model may be used to for independently coupling the two resonances to the incident wave, where each resonance is defined by a characteristic resonance frequency and absorption loss. Because the two sub-cells may be positioned in a subwavelength thickness, transmission-line theory can offer a valid approximation. However, in the absence of a more complex model, such a transmission-line model can lead to complex transcendental equations for the coupling coefficients, and may overlook some effects such as evanescent coupling between the sub-cells. As such, further abstraction may be performed using CMT. While some of details may be lost in such as refined framework, the model may still provide insights into the interplay between resonance frequencies that generalize beyond the specific unit-cell design and even into other domains of wave physics.

In this regard, a model for metasurface unit cell 100 may include two resonances that independently couple to the plane-wave radiation with strength K, and have a respective resonance frequency ($\omega_0 \mp \Delta\omega/2$) and absorption rates ($\gamma_0$ and $\gamma_0+\Delta\gamma$), respectively. The term $\Delta\omega$ may capture a difference in resonance frequencies between the two modes, and $\Delta\gamma$ may account for any difference in absorption. It is acknowledged that such a simplified model may not consider some effects, such as direct coupling between sub-cells and phase accumulation through the substrate (e.g., the spacer layer 160 and the ground plane 170). However, such a model can be useful due to its simplicity and ability to build intuition in the results.

The effect of various system parameters can be realized by adding contributions from each by sequentially adding the parameters one by one. Using this approach it is shown that when $\Delta\omega=0$ and $\Delta\gamma=0$, the model operates to provide a single resonance. As $\omega_0$ is varied relative to the incident frequency $\omega$, the reflected signal undergoes a phase shift, but also an amplitude dip from passing through resonance. However, a one-to-one relationship still exists between amplitude and phase. When a constant $\Delta\omega$ is introduced and $\omega_0$ is again varied, a phase shift of about $4\pi$ occurs resulting in about two amplitude points for each reflection phase. If the two resonant frequencies can be independently tuned, a solid area of the complex response, and this case reflection, map may be filled, including some amplitude bands where a full $2\pi$ of phase may be available. Finally, more absorption may be added to the second mode, and the two resonances may be independently varied. As a result, the maximum amplitude, where full phase coverage is available, increases.

Based on the foregoing, for the metasurface unit cell 100, the metasurface sub-cell 102 may include a variable impedance element with a varactor and a resistor to permit the sub-cell 102 to be varactor-tuned with the resistor in series with the varactor. For a resistance in series with a capacitance, as the capacitance increases, a redshift of the resonances occurs and current flows more freely through the resistor under radio frequency (RF) illumination. As a result, the power dissipation increases for a given voltage. In contrast with a p-i-n diode, which can be switched discretely between conductive and resistive states, use of a varactor-resistor series combination may allow for a continuous tuning of the effective losses. The inclusion of the resistance may increase the relative change in loss compared to the induced resonance shift by the capacitance change, thereby allowing more control over the amplitude.

FIG. 15 is a chart 800 including graphs of simulated scattering parameters for the metasurface unit cell 100 at four different bias states 801, 802, 803, and 804, as defined in the chart 800. Since the metasurface unit cell 100 includes two dynamic sub-cells, two resonances occur during operation and those two resonances may be tuned. In this regard, increasing $C_1$ (FIG. 14) generally redshifts the resonances having a slight effect on the amplitude. Increasing $C_2$, which has an additional resistance $R_2$ in series (i.e., $R_2$ is greater than $R_1$) also redshifts the resonances. However, the redshifts due to increasing $C_2$ result in a much larger effect on the amplitudes, relative to a comparable increase in $C_1$. Accordingly, all of the curves in the chart 800 are in the underdamped regime, such that increasing the effective losses may bring the device closer to critical damping. Eventually, the dissipation will be excessive (overdamping), and an increase effective losses may reduce absorption. Therefore, being able to tune through underdamped and overdamped conditions for a resonance at a given frequency can generally provide an ability to cover a wide range of phases, in some instances, up to a certain maximum amplitude.

For the metasurface unit cell 100, each dynamic sub-cell 101 and 102 may include, according to some example embodiments, a patterned layer (e.g., patterned layer 110 and patterned layer 150) with a square patch (e.g., inner portion 115 and inner portion 155) at a center and a thin metallic mesh around a perimeter (e.g., outer portion 111 and outer portion 151). The mesh and the patch may be connected on each side of the square shape with thin metal strips in line with a varactor diode on each side. A patterned layer for one of the sub-cells may also include a lumped resistor added between the strips and the mesh. According to some example embodiments, the bias voltage between the perimeter mesh and the patch may determine the effective capacitance of the varactor diode, and thus the resonance properties of the unit cell (i.e., the EMF response) may be modified in this manner. Since the varactor diode may consistently be in reverse bias, according to some example embodiments, a minimal steady-state current may flow through the resistor (e.g., resistor 53) due to a DC component of the biasing voltage. In between the two dynamic patterned layers 110 and 150, separated by the dielectric layers, the connectivity interface 130 may include, for example, a metallic grid (e.g. trace 180) rotated at 45 degrees, as shown in FIG. 4. The intersection at 182 may align with the center of the patches (e.g., inner portions 115 and 155) on either dynamic patterned layer. The patches, according to some example embodiments, may also be connected to connectivity interface 130 by vias (e.g., vias 132 and 134). Connecting the patches in this manner, according to some example embodiments, may set a common ground for the biasing network of the metasurface unit cell 100. Additionally, as mentioned above, the spacer layer 160 may separate sub-cells 101 and 102 from a metallic backplane (e.g., the ground plane 170).

According to some example embodiments, the resistance value for the resistors 53, 55, 57, and 59 (FIG. 6) may be about 2 Ohms added in series with the varactor diodes in the metasurface sub-cell 102. Such a resistance value, according to some example embodiments, may be about half of the intrinsic resistance of the varactor diode (4.8 Ohms). As mentioned above, the patch associated with the inner portion 155 may have a slightly larger area, which may cause the metasurface sub-cell 102 to resonate at a higher frequency than the metasurface sub-cell 101. The resonance frequency may be higher because the frequency is actually determined by lengths of the strips (e.g., lengths of the outer portion 111) between the patches, rather than being based on the resonance of the patches themselves.

As the capacitance ($C_2$) of the metasurface sub-cell 102 is increased, a corresponding increase in current flow may occur (e.g., resistors 53, 55, 57, and 59) and the loss at resonance may increase to a point of reaching critical damping (perfect absorption) and then overdamping (phase going through zero instead of wrapping around $\pm\pi$). Again, increasing $C_2$ may also redshift the resonance slightly. As such, the metasurface device 40 may be brought back to resonance by then decreasing the capacitance ($C_1$) in the metasurface sub-cell 101, as shown in FIG. 16. Accordingly, by tuning the capacitances, a wide area of complex reflection coefficient space (or more broadly, response coefficient space) may be covered in according to some example embodiments. FIG. 16 includes charts 900 and 910 that illustrate the operation of the metasurface unit cell 100 in response to differing capacitance values. In this regard, the graphs of the charts 900 and 910 are for a fixed frequency and, therefore, each graph is associated with a fixed value of $C_2$, which is a subset of a more complete [$C_1$, $C_2$] space where both are continually varied.

Since a direct relationship exists between the varactor diode's capacitance and the applied voltage, a C→V conversion may be performed based on characteristic information for the varactor diode, for example, provided in a data sheet for the varactor diode. This conversion may allow for improved comparisons with experimental results. For such a comparison, the graphs 1000 and 1010 of FIG. 17 show a phase and amplitude map, respectively, of the response, in this case a reflection, from the metasurface unit cell 100 at 2.9 GHz determined using the defined model. For comparison, graphs 1001 and 1011 of FIG. 18 show a phase and amplitude map, respectively, of the reflection from the metasurface unit cell 100 at 2.9 GHz determined via experimentation. Additionally, the graphs 1100 and 1110 of FIG. 19 show the phase and amplitude map, respectively, of the reflection from the metasurface unit cell 100 at 3.4 GHz determined using the defined model. Again, for comparison, graphs 1101 and 1111 of FIG. 20 show a phase and amplitude map, respectively, of the reflection from the metasurface unit cell 100 at 3.4 GHz determined via experimentation.

Additionally, experimentation has been performed in a communications context using a number of differing modulation techniques with the metasurface unit cell 100. Results of such experimentation is shown in FIG. 21 with the chart 1700 showing a graph of the phase relative to time. Moreover, constellation diagrams are provided in charts 1710, 1720, and 1730, with the results based on the same communications experimentation. In this regard, the constellation chart 1710 is based on a QAM (quadrature amplitude modulation) approach for modulation. Similarly, the chart 1720 is based on a binary phase-shift keying (BPSK) approach, and the chart 1730 is based on a quadrature phase shift keying (QPSK) approach. Further description of the modulation techniques and the associated structures may be found in *Dual-Resonance Dynamic Metasurface for Independent Magnitude and Phase Modulation*, Timothy Sleasman, Robert Duggan, Ra'id S. Awadallah, and David Shrekenhamer; Phys. Rev. Applied 20, 014004, published 5 Jul. 2023, the substance of which is included in the provisional patent application to which this application claims priority, and which is hereby incorporated by reference in its entirety.

Now referring to FIG. 26, an example method 1800 for exhibiting an electromagnetic field (EMF) response from a metasurface unit cell is shown as a flowchart. According to some example embodiments, the example method may include, at 1810, receiving a first control signal at a first variable impedance element of a first metasurface sub-cell of the metasurface unit cell, and, at 1820, receiving a second control signal at a second variable impedance element of a second metasurface sub-cell of the metasurface unit cell. Further, the example method may include, at 1830, independently modifying a first EMF response exhibited by the first metasurface sub-cell based on the first control signal, and, at 1840, independently modifying a second EMF response exhibited by the second metasurface sub-cell based on the second control signal. Finally, at 1850, the example method may include exhibiting an integrated EMF response by the metasurface unit cell based on coupling of the first EMF response with the second EMF response due to the first metasurface sub-cell and the second metasurface sub-cell being disposed in a cascaded configuration. The integrated EMF may be controllably tuned by the first control signal and the second control signal to a desired magnitude and phase for a given frequency.

Having described some example embodiments in the foregoing description, some additional example embodiments will now be described that are based the foregoing description. According to some example embodiments, a metasurface system is provided that may include a metasurface device including at least one metasurface unit cell, a control interface operably coupled to the metasurface device, and control circuitry configured to output a control signal for delivery to the metasurface unit cell to control operation of the metasurface unit cell. The metasurface unit cell may include a first metasurface sub-cell configured to exhibit a first resonant electromagnetic field (EMF) response and a second metasurface sub-cell configured to exhibit a second resonant EMF response. The first metasurface sub-cell may include a first patterned layer and a first variable impedance element operably coupled to the first patterned layer. The first variable impedance element may be configured to, in response to receipt of a first control signal based on a control signal from the control circuitry, change a first impedance of the first metasurface sub-cell based on the first control signal to change the first EMF response. The second metasurface sub-cell may include a second patterned layer and a second variable impedance element. The second variable impedance element may be configured to, in response to receipt of a second control signal based on a control signal from the control circuitry, change a second impedance of the second metasurface sub-cell based on the second control signal to change the second EMF response. The first metasurface sub-cell and the second metasurface sub-cell may be disposed in a cascaded configuration such that first EMF response and the second EMF response couple to exhibit an integrated EMF response for the metasurface unit cell.

Additionally, according to some example embodiments of the metasurface system, the metasurface unit cell may also include a connectivity interface operably coupled to first patterned layer and the second patterned layer to deliver the first control signal to the first patterned layer and the second control signal to the second patterned layer. Additionally, according to some example embodiments, via the connectivity interface, the first control signal may be applied as a first voltage bias across the first variable impedance element, and, via the connectivity interface, the second control signal is applied as a second voltage bias across the first variable impedance element.

Additionally or alternatively, according to some example embodiments of the metasurface system, the first variable impedance element may include a first variable reactance element, and the second variable impedance element may include a second variable reactance element and a resistive element.

Additionally or alternatively, according to some example embodiments of the metasurface system, the first variable impedance element may include a first varactor diode configured to change a first capacitance of the first varactor diode in response to the first control signal to thereby change the first impedance of the first metasurface sub-cell. Additionally, the second variable impedance element may include a second varactor diode configured to change a second capacitance of the second varactor diode in response to the second control signal to thereby change the second impedance of the second metasurface sub-cell.

Additionally or alternatively, according to some example embodiments of the metasurface system, the control circuitry may be configured to adjust the first control signal and the second control signal to independently change the first EMF response and the second EMF response to tune both a magnitude and a phase of the integrated EMF response exhibited by the metasurface unit cell.

Additionally or alternatively, according to some example embodiments of the metasurface system, a first centroid of the first patterned layer of the metasurface unit cell may be aligned with a second centroid of the second patterned layer, such that an center line through the first centroid and the second centroid is perpendicular to planes of the first patterned layer and the second patterned layer.

Additionally or alternatively, according to some example embodiments of the metasurface system, the metasurface device may include a plurality of metasurface cells including the metasurface unit cell. Further, the plurality of metasurface cells may be arranged in a first metasurface cell layer and a second metasurface cell layer. The first metasurface cell layer and the second metasurface cell layer may be disposed in a cascaded configuration such that the layers are physically coupled together and aligned. Additionally, the connectivity interface may include a dedicated electrical connection to each sub-cell of each metasurface cell within the plurality of metasurface cells. Further, via the control interface, the control circuitry may be configured to provide a dedicated control signal to each sub-cell of each metasurface cell within the plurality of metasurface cells via the dedicated electrical connections of the connectivity interface. Additionally or alternatively, the connectivity interface may include a first electrical connection that is electrically connected to each first metasurface sub-cell of each metasurface cell within the first metasurface cell layer, and a second electrical connection that is electrically connected to each second metasurface sub-cell of each metasurface cell within the first metasurface cell layer. Further, via the control interface, the control circuitry may be configured to provide the first control signal to the first electrical connection and the second control signal to second electrical connection, and, via the connectivity interface, each metasurface cell of the first metasurface cell layer may be commonly controlled by the first control signal and the second control signal.

Additionally or alternatively, according to some example embodiments of the metasurface system, the first patterned layer may include a first central patch portion and a first outer portion, wherein the first variable impedance element is electrically connected between the first central patch portion and the first outer portion. Additionally, the second patterned layer includes a second central patch portion and a second outer portion. Additionally, the second variable impedance element may include a variable reactance element and a resistive element. The variable reactance element and the resistive element may be electrically connected in series between the second central patch portion and the second outer portion.

According to some example embodiments, a metasurface unit cell for a metasurface device is provided. The metasurface unit cell may include a first metasurface sub-cell configured to exhibit a first resonant electromagnetic field (EMF) response and a second metasurface sub-cell configured to exhibit a second resonant EMF response. The first metasurface sub-cell may include a first patterned layer and a first variable impedance element operably coupled to the first patterned layer. The first variable impedance element may be configured to, in response to receipt of a first control signal, change a first impedance of the first metasurface sub-cell based on the first control signal to change the first EMF response. The second metasurface sub-cell may include a second patterned layer and a second variable impedance element, the second variable impedance element being configured to, in response to receipt of a second control signal, change a second impedance of the second metasurface sub-cell based on the second control signal to change the second EMF response. The first metasurface sub-cell and the second metasurface sub-cell may be disposed in a cascaded configuration such that first EMF response and the second EMF response couple to exhibit an integrated EMF response for the metasurface unit cell.

Additionally, according to some example embodiments of the metasurface unit cell, the metasurface unit cell may further include a connectivity interface operably coupled to first patterned layer and the second patterned layer to deliver the first control signal to the first patterned layer and the second control signal to the second patterned layer. The connectivity layer may be configured to receive a control signal, route the control signal to the first patterned layer as the first control signal, and route the control signal (i.e., the same control signal) to the second patterned layer as the second control signal.

Additionally or alternatively, according to some example embodiments of the metasurface unit cell, via the connectivity interface, the first control signal may be applied as a first voltage bias across the first variable impedance element, and, via the connectivity interface, the second control signal may be applied as a second voltage bias across the first variable impedance element.

Additionally or alternatively, according to some example embodiments of the metasurface unit cell, the first variable impedance element may include a first variable reactance element, and, the second variable impedance element may include a second variable reactance element and a resistive element.

Additionally or alternatively, according to some example embodiments of the metasurface unit cell, the first variable impedance element may include a first varactor diode configured to change a first capacitance of the first varactor diode in response to the first control signal to thereby change the first impedance of the first metasurface sub-cell. Additionally, the second variable impedance element may include a second varactor diode configured to change a second capacitance of the second varactor diode in response to the second control signal to thereby change the second impedance of the second metasurface sub-cell.

Additionally or alternatively, according to some example embodiments of the metasurface unit cell, the first control signal may independently change the first EMF response and the second control signal may independently change the second EMF response to tune both a magnitude and a phase of the integrated EMF response exhibited by the metasurface unit cell.

Additionally or alternatively, according to some example embodiments of the metasurface unit cell, a first centroid of the first patterned layer of the metasurface unit cell may be aligned with a second centroid of the second patterned layer such that an center line through the first centroid and the second centroid is perpendicular to planes of the first patterned layer and the second patterned layer.

Additionally or alternatively, according to some example embodiments of the metasurface unit cell, the first patterned layer may include a first central patch portion and a first outer portion, and the first variable impedance element may be electrically connected between the first central patch portion and the first outer portion. Additionally, the second patterned layer may include a second central patch portion and a second outer portion, and the second variable impedance element may include a variable reactance element and a resistive element, and, the variable reactance element and the resistive element may be electrically connected in series between the second central patch portion and the second outer portion.

According to some example embodiments, a method for exhibiting an electromagnetic field (EMF) response from a metasurface unit cell is provided. The method may include receiving a first control signal at a first variable impedance element of a first metasurface sub-cell of the metasurface unit cell and receiving a second control signal at a second variable impedance element of a second metasurface sub-cell of the metasurface unit cell. The method may further include independently modifying a first EMF response exhibited by the first metasurface sub-cell based on the first control signal, and independently modifying a second EMF response exhibited by the second metasurface sub-cell based on the second control signal. The method may also include exhibiting an integrated EMF response by the metasurface unit cell based on coupling of the first EMF response with the second EMF response due to the first metasurface sub-cell and the second metasurface sub-cell being disposed in a cascaded configuration. The integrated EMF response may be controllably tuned by the first control signal and the second control signal to a desired magnitude and phase.

Many modifications and other embodiments of the metasurface device set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A metasurface system comprising:

a metasurface device comprising a metasurface unit cell;

a control interface operably coupled to the metasurface device; and control circuitry configured to output a control signal for delivery to the metasurface unit cell to control operation of the metasurface unit cell;

wherein the metasurface unit cell comprises:

a first metasurface sub-cell configured to exhibit a first resonant electromagnetic field (EMF) response, the first metasurface sub-cell comprising a first patterned layer and a first variable impedance element operably coupled to the first patterned layer, the first variable impedance element being configured to, in response to receipt of a first control signal based on a control signal from the control circuitry, change a first impedance of the first metasurface sub-cell based on the first control signal to change the first EMF response; and a second metasurface sub-cell configured to exhibit a second resonant EMF response, the second metasurface sub-cell comprising a second patterned layer and a second variable impedance element, the second variable impedance element being configured to, in response to receipt of a second control signal based on a control signal from the control circuitry, change a second impedance of the second metasurface sub-cell based on the second control signal to change the second EMF response, wherein the first metasurface sub-cell and the second metasurface sub-cell are disposed in a cascaded configuration such that first EMF response and the second EMF response couple to exhibit an integrated EMF response for the metasurface unit cell.

2. The metasurface system of claim 1, wherein the metasurface unit cell further comprises a connectivity interface operably coupled to first patterned layer and the second patterned layer to deliver the first control signal to the first patterned layer and the second control signal to the second patterned layer.

3. The metasurface system of claim 2, wherein, via the connectivity interface, the first control signal is applied as a first voltage bias across the first variable impedance element; and wherein, via the connectivity interface, the second control signal is applied as a second voltage bias across the first variable impedance element.

4. The metasurface system of claim 2, wherein the metasurface device comprises a plurality of metasurface cells including the metasurface unit cell;

wherein the plurality of metasurface cells are arranged in a first metasurface cell layer and a second metasurface cell layer, the first metasurface cell layer and the second metasurface cell layer being disposed in a cascaded configuration.

5. The metasurface system of claim 4, wherein the connectivity interface comprises a dedicated electrical connection to each sub-cell of each metasurface cell within the plurality of metasurface cells; and wherein, via the control interface, the control circuitry is configured to provide a dedicated control signal to each sub-cell of each metasurface cell within the plurality of metasurface cells via the dedicated electrical connections of the connectivity interface.

6. The metasurface system of claim 4, wherein the connectivity interface comprises:

a first electrical connection that is electrically connected to each first metasurface sub-cell of each metasurface cell within the first metasurface cell layer; and a second electrical connection that is electrically connected to each second metasurface sub-cell of each metasurface cell within the first metasurface cell layer;

wherein, via the control interface, the control circuitry is configured to provide the first control signal to the first electrical connection and the second control signal to second electrical connection;

wherein, via the connectivity interface, each metasurface cell of the first metasurface cell layer is commonly controlled by the first control signal and the second control signal.

7. The metasurface system of claim 1, wherein the first variable impedance element comprises a first variable reactance element; and wherein the second variable impedance element comprises a second variable reactance element and a resistive element.

8. The metasurface system of claim 1, wherein the first variable impedance element comprises a first varactor diode configured to change a first capacitance of the first varactor diode in response to the first control signal to thereby change the first impedance of the first metasurface sub-cell; and wherein the second variable impedance element comprises a second varactor diode configured to change a second capacitance of the second varactor diode in response to the second control signal to thereby change the second impedance of the second metasurface sub-cell.

9. The metasurface system of claim 1, wherein the control circuitry is configured to adjust the first control signal and the second control signal to independently change the first EMF response and the second EMF response to tune both a magnitude and a phase of the integrated EMF response exhibited by the metasurface unit cell.

10. The metasurface system of claim 1, wherein a first centroid of the first patterned layer of the metasurface unit cell is aligned with a second centroid of the second patterned layer, such that an center line through the first centroid and the second centroid is perpendicular to planes of the first patterned layer and the second patterned layer.

11. The metasurface system of claim 1, wherein the first patterned layer comprises a first central patch portion and a first outer portion, wherein the first variable impedance element is electrically connected between the first central patch portion and the first outer portion;

wherein the second patterned layer comprises a second central patch portion and a second outer portion;

wherein the second variable impedance element comprises a variable reactance element and a resistive element;

wherein the variable reactance element and the resistive element are electrically connected in series between the second central patch portion and the second outer portion.

12. A metasurface unit cell for a metasurface device, the metasurface unit cell comprising:

a first metasurface sub-cell configured to exhibit a first resonant electromagnetic field (EMF) response, the first metasurface sub-cell comprising a first patterned layer and a first variable impedance element operably coupled to the first patterned layer, the first variable impedance element being configured to, in response to receipt of a first control signal, change a first impedance of the first metasurface sub-cell based on the first control signal to change the first EMF response; and a second metasurface sub-cell configured to exhibit a second resonant EMF response, the second metasurface sub-cell comprising a second patterned layer and a second variable impedance element, the second variable impedance element being configured to, in response to receipt of a second control signal, change a second impedance of the second metasurface sub-cell based on the second control signal to change the second EMF response;

wherein the first metasurface sub-cell and the second metasurface sub-cell are disposed in a cascaded configuration such that first EMF response and the second EMF response couple to exhibit an integrated EMF response for the metasurface unit cell.

13. The metasurface unit cell of claim 12, wherein the metasurface unit cell further comprises a connectivity interface operably coupled to first patterned layer and the second patterned layer to deliver the first control signal to the first patterned layer and the second control signal to the second patterned layer;

wherein the connectivity interface is configured to receive a control signal, route the control signal to the first patterned layer as the first control signal, and route the control signal to the second patterned layer as the second control signal.

14. The metasurface unit cell of claim 13, wherein, via the connectivity interface, the first control signal is applied as a first voltage bias across the first variable impedance element; and wherein, via the connectivity interface, the second control signal is applied as a second voltage bias across the first variable impedance element.

15. The metasurface unit cell of claim 12, wherein the first variable impedance element comprises a first variable reactance element; and wherein the second variable impedance element comprises a second variable reactance element and a resistive element.

16. The metasurface unit cell of claim 12, wherein the first variable impedance element comprises a first varactor diode configured to change a first capacitance of the first varactor diode in response to the first control signal to thereby change the first impedance of the first metasurface sub-cell; and wherein the second variable impedance element comprises a second varactor diode configured to change a second capacitance of the second varactor diode in response to the second control signal to thereby change the second impedance of the second metasurface sub-cell.

17. The metasurface unit cell of claim 12, wherein the first control signal independently changes the first EMF response and the second control signal independently changes the second EMF response to tune both a magnitude and a phase of the integrated EMF response exhibited by the metasurface unit cell.

18. The metasurface unit cell of claim 12, wherein a first centroid of the first patterned layer of the metasurface unit cell is aligned with a second centroid of the second patterned layer, such that an center line through the first centroid and the second centroid is perpendicular to planes of the first patterned layer and the second patterned layer.

19. The metasurface unit cell of claim 12, wherein the first patterned layer comprises a first central patch portion and a first outer portion, wherein the first variable impedance element is electrically connected between the first central patch portion and the first outer portion;

wherein the second patterned layer comprises a second central patch portion and a second outer portion;

wherein the second variable impedance element comprises a variable reactance element and a resistive element;

wherein the variable reactance element and the resistive element are electrically connected in series between the second central patch portion and the second outer portion.

20. A method for exhibiting an electromagnetic field (EMF) response from a metasurface unit cell, the method comprising:

receiving a first control signal at a first variable impedance element of a first metasurface sub-cell of the metasurface unit cell;

receiving a second control signal at a second variable impedance element of a second metasurface sub-cell of the metasurface unit cell;

independently modifying a first EMF response exhibited by the first metasurface sub-cell based on the first control signal;

independently modifying a second EMF response exhibited by the second metasurface sub-cell based on the second control signal; and exhibiting an integrated EMF response by the metasurface unit cell based on coupling of the first EMF response with the second EMF response due to the first metasurface sub-cell and the second metasurface sub-cell being disposed in a cascaded configuration, the integrated EMF response being controllably tuned by the first control signal and the second control signal to a desired magnitude and phase.

* * * * *